(12) United States Patent
Morita et al.

(10) Patent No.: US 6,354,818 B2
(45) Date of Patent: Mar. 12, 2002

(54) OSCILLATION-TYPE COMPRESSOR

(75) Inventors: Ichiro Morita; Masanori Kobayashi; Koh Inagaki, all of Fujisawa; Makoto Katayama, Zushi, all of (JP)

(73) Assignee: Matsushita Refrigeration Company, Osaka (JP)

( * ) Notice: Subject to any disclaimer, the term of this patent is extended or adjusted under 35 U.S.C. 154(b) by 0 days.

(21) Appl. No.: 09/740,949

(22) Filed: Dec. 21, 2000

Related U.S. Application Data

(62) Division of application No. 09/170,035, filed on Oct. 13, 1998, now Pat. No. 6,203,292.

(30) Foreign Application Priority Data

| Oct. 15, 1997 | (JP) | ................................ 9-281733 |
| Oct. 15, 1997 | (JP) | ................................ 9-281734 |
| Apr. 20, 1998 | (JP) | ............................. 10-109110 |
| Apr. 21, 1998 | (JP) | ............................. 10-110472 |
| Apr. 21, 1998 | (JP) | ............................. 10-110476 |

(51) Int. Cl.[7] .............................................. F04B 17/00
(52) U.S. Cl. ..................... 417/419; 417/415; 417/416; 60/6
(58) Field of Search ................................. 417/419, 415, 417/416, 399, 400, 375, 490, 338; 62/6; 367/189

(56) References Cited

U.S. PATENT DOCUMENTS

| 2,988,264 A | | 6/1961 | Reutter | |
| 3,344,397 A | * | 9/1967 | Elliott et al. | ................. 367/189 |
| 3,790,833 A | | 2/1974 | Hasebe | |
| 3,947,155 A | | 3/1976 | Bidol | |
| 5,088,288 A | * | 2/1992 | Katagishi et al. | ................. 62/6 |
| 5,351,490 A | * | 10/1994 | Ohishi et al. | ..................... 62/6 |
| 6,056,519 A | * | 5/2000 | Morita et al. | ................ 417/415 |

FOREIGN PATENT DOCUMENTS

| DE | 2441604 | 3/1976 |
| EP | 0846750 | 6/1998 |
| JP | 51-57009 | 5/1976 |
| JP | 59-87285 | 5/1984 |
| JP | 4-347460 | 12/1992 |
| JP | 8-247025 | 9/1996 |
| JP | 9/324764 | 12/1997 |

* cited by examiner

*Primary Examiner*—Philip H. Leung
*Assistant Examiner*—Quang Van
(74) *Attorney, Agent, or Firm*—Louis Woo

(57) ABSTRACT

A tightly closed casing has an inside space for storing coolant gas. A block is accommodated in this casing. A motor includes a stator and a mover. A piston is connected to the mover of the motor. A movable element includes the mover of the motor and the piston. A stationary element includes the stator of the motor and the block. An elastic element has a portion fixed to the movable element and another portion fixed to the stationary element. A cylinder is shiftable in an axial direction with respect the block. A shifting device shifts the cylinder in the axial direction.

1 Claim, 17 Drawing Sheets

OSCILLATION-TYPE COMPRESSOR

This Appln is a Divisional of Ser. No. 09/170,035 filed Oct. 13, 1998, U.S. Pat. No. 6,203,292.

BACKGROUND OF THE INVENTION

The present invention relates to an oscillation-type compressor preferably used in a refrigerator and an air-conditioner.

Various conventional oscillation-type compressors are disclosed in Published Japanese Patent Applications Nos. Kokai 51-57009, Kokai 8-247025, Kokai 9-324764, and Kokai 4-347460.

The oscillation-type compressors basically comprise a movable element including a piston and a stationary element including a cylinder, so that gas is introduced into a compression chamber defined by the piston and the cylinder and compressed by the piston that reciprocates in the axial direction.

SUMMARY OF THE INVENTION

An object of the present invention is to provide an oscillation-type compressor capable of minimizing the top clearance of the piston in a given piton stroke and maintaining efficient compressor operations.

Another object of the present invention is to realize a practical cooling device, such as a refrigerator, which is capable of automatically increasing the stroke of the piston in response to a high ambient air temperature so that the cooling power can be sufficiently obtained even in such a high load condition and is also capable of automatically reducing the stroke of the piston in response to a decreased ambient air temperature, thereby realizing efficient compressor operation in accordance with the driving conditions of the cooling device without using additional detecting and control devices.

Another object of the present invention is to provide an oscillation-type compressor capable of suppressing the top clearance of the piston even in the start-up operation where the piston is operated with short strokes, thereby realizing efficient compressor operation.

Another object of the present invention is to provide an oscillation-type compressor capable of stabilizing the cylinder position during an ordinary operation.

Another object of the present invention is to provide an oscillation-type compressor capable of optimizing the piston position with respect to the cylinder position irrespective of changed operating pressure conditions, thereby minimizing the top clearance and realizing efficient compressor operation.

Another object of the present invention is to provide an oscillation-type compressor capable of preventing the piston from colliding with the exhaust valve when the piston stroke is increased, thereby eliminating any damage and noise.

Another object of the present invention is to provide an oscillation-type compressor having an exhaust or intake pipe shiftable in the axial direction even when large vibration occurs in the axial direction, thereby reducing a large amplitude stress repetitively acting on the exhaust or intake pipe.

In order to accomplish the above and other related objects, one aspect of the present invention provides an oscillation-type compressor comprising a tightly closed casing having an inside space for storing coolant gas, a block accommodated in the tightly closed casing, a motor including a stator and a mover, a piston connected to the mover of the motor, a movable element including the mover of the motor and the piston, a stationary element including the stator of the motor and the block, an elastic element having a portion fixed to the movable element and another portion fixed to the stationary element, a cylinder shiftable in an axial direction with respect the block, and a shifting device for shifting the cylinder in the axial direction.

Another aspect of the present invention provides an oscillation-type compressor comprising a tightly closed casing having an inside space for storing coolant gas, a block accommodated in the tightly closed casing, a motor including a stator and a mover, a piston connected to the mover of the motor, a movable element including the mover of the motor and the piston, a stationary element including the stator of the motor and the block, an elastic element having one portion fixed to the movable element and another portion fixed to the stationary element, a cylinder shiftable with respect the block, a cylinder head fixed to the cylinder, back-pressure chambers formed in the coolant gas space and airtightly partitioned by an integral unit including at least one of the cylinder and the cylinder head, and at least one of the back-pressure chambers being held at a low pressure level and another one of the back-pressure chambers being held at a high pressure level.

It is preferable that this oscillation-type compressor further comprises an elastic member having one end connected to the integral unit including at least one of the cylinder and the cylinder head and the other end connected to the stationary element, and further comprises a cylinder position detecting sensor fixed to one of the stationary element and the cylinder.

Another aspect of the present invention provides an oscillation-type compressor, comprising a tightly closed casing having an inside space for storing coolant gas, a block accommodated in the tightly closed casing, a motor including a stator and a mover, a piston connected to the mover of the motor, a movable element including the mover of the motor and the piston, a stationary element including the stator of the motor and the block, an elastic element having one portion fixed to the movable element and another portion fixed to the stationary element, a cylinder fixed to the block or shiftable in an axial direction with respect the block, a cylinder head fixed to the cylinder, an auxiliary pipe having one end shiftable in the axial direction with respect to one of an exhaust pipe and an intake pipe and the other end fixed to one of the cylinder and the cylinder head.

Furthermore, another object of the present invention is to provided an oscillation-type compressor capable of causing the cylinder to shift toward the top dead center when the ambient temperature is high and therefore the required cooling power is high.

Another object of the present invention is to provide an oscillation-type compressor capable of surely reducing the pulsation of the compressor even when the discharged gas amount increases in response to an increased stroke, thereby suppressing noise and vibration.

Another object of the present invention is to provide an oscillation-type compressor capable of preventing the compressor efficiency from deteriorating due to the leakage of coolant gas.

Another object of the present invention is to provide an oscillation-type compressor capable of preventing the cylinder from shifting excessively toward the top dead center, while causing no problems in the reliability of the elastic element or the like.

In order to accomplish the above and other related objects, one aspect of the present invention provides an oscillation-type compressor comprising a block and a piston accommodated in a tightly closed casing, a motor including a stator and a mover, a movable element including the mover and the piston, a stationary element including the block and the stator, an elastic element having a portion fixed to the movable element and another portion fixed to the stationary element, a cylinder accommodating the piston so that the piston is shiftable in an axial direction, the cylinder being inserted in the block so as to reciprocate in the axial direction with a closed space formed between the block and the cylinder, a cylinder head comprising an exhaust chamber and attached to the cylinder, and a communication passage connecting the closed space and the exhaust chamber.

It is preferable that the above-described closed space is connected to an outside space via an exhaust pipe. And, a slide surface between the cylinder and the block is connected to a lower part of the closed space via a passage. A groove is provided on a slide surface of one of the cylinder and the block.

Furthermore, another object to the present invention is to provide an oscillation-type compressor capable of increasing the top clearance of the piston in response to a decreased ambient air temperature or a decreased load without deteriorating the operating efficiency of the compressor.

Another object of the present invention is to provide an oscillation-type compressor capable of causing the stator of the motor to shift in a direction opposed to the compression chamber when the top dead center position of the piston is dislocated toward the cylinder head, thereby preventing the piston from colliding with the exhaust valve.

Another object of the present invention is to provide an oscillation-type compressor capable of shifting the motor stator in the direction opposed to the compression chamber when the compressor is stopped.

In order to accomplish the above and other related objects, one aspect of the present invention provides an oscillation-type compressor comprising a tightly closed casing having an inside space for storing coolant gas, a cylinder accommodated in the tightly closed casing, a motor including a stator and a mover, a piston connected to the mover of the motor, a movable element including the mover of the motor and the piston, a stationary element including the stator of the motor and the cylinder, an elastic element having a portion fixed to the movable element and another portion fixed to the stationary element, a piton position detecting sensor detecting the position of the piston, top dead center position calculating means for calculating a top dead center position of the piston based on a piston position signal obtained from the piton position detecting sensor, amplitude control means for controlling an amplitude of the mover in accordance with a difference between the top dead center position and a selected top dead center reference value, and top dead center reference value changing means for changing the top dead center reference value.

Another aspect of the present invention provides an oscillation-type compressor comprising a tightly closed casing having an inside space for storing coolant gas, a cylinder and a block accommodated in the tightly closed casing, a motor including a stator and a mover, a piston connected to the mover of the motor, a movable element including the mover of the motor and the piston, a stationary element including the stator of the motor, the cylinder and the block, an elastic element having a portion fixed to the movable element and another portion fixed to the stationary element, the stator of the motor or a movable stator base connected to the stator being partly coupled with the stationary element so as to reciprocate in an axial direction in response to a pressure imbalance between back-pressure chambers formed therebetween, and a pressure control mechanism for controlling the pressures of the back-pressure chambers.

It is preferable that a shifting means is provided for shifting the stator of the motor in a direction opposed to the compression chamber when the compressor is stopped.

Furthermore, another object of the present invention is to reduce the weight of a sensor core attached to the movable element to realize a compact displacement detector, thereby obtaining a higher resonance frequency and realizing a high power compressor.

Another object of the present invention is to provide a displacement detector having a limited detection range, thereby improving the accuracy in the measurement of the piston position in the vicinity of the top dead center.

Another object of the present invention is to provide the weight of the movable element, thereby suppressing vibration.

Another object of the present invention is to provide the cooling power from deteriorating due to the coolant gas leakage from the compression chamber.

Another object of the present invention is to reduce the slide loss between the cylinder and the piston, thereby improving the compressor efficiency.

In order to accomplish the above and other related objects, one aspect of the present invention provides an oscillation-type compressor comprising a block and a piston, a motor including a stator and a mover, a movable element including the mover and the piston, a stationary element including the block and the stator, an elastic element having a portion fixed to the movable element and another portion fixed to the stationary element, a cylinder accommodating the piston so as to allow the piston reciprocating in an axial direction, a displacement detector connected to the piston in the axial direction for detecting a position near a top dead center of the piston, top dead center position detecting means for obtaining the top dead center position of the piston based on a signal obtained from the displacement detector, current/voltage detecting means for detecting a current or voltage value of the motor, and power supply means for changing the voltage applied to the motor based on output signals of the top dead center position detecting means and the current/voltage detecting means.

Another aspect of the present invention provides an oscillation-type compressor comprising a block and a piston, a motor including a stator and a mover, a movable element including the mover and the piston, a stationary element including the block and the stator, an elastic element having a portion fixed to the movable element and another portion fixed to the stationary element, a cylinder accommodating the piston so as to allow the piston reciprocating in an axial direction, and a displacement detector attached to the movable element and the stationary element at a radially inward portion with respect to the stator of the motor.

Another aspect of the present invention provides an oscillation-type compressor comprising a block and a piston, a motor including a stator and a mover, a movable element including the mover and the piston, a stationary element including the block and the stator, an elastic element having a portion fixed to the movable element and another portion fixed to the stationary element, a rotational direction restricting mechanism for limiting the rotation of the elastic element about a piston shaft in a single direction, a cylinder accommodating the piston so as to allow the piston reciprocating in an axial direction, and a dynamic pressure generating mechanism provided on at least one of the piston and the cylinder.

Furthermore, another object of the present invention is to provide an oscillation-type compressor capable of sufficiently supporting the movable element in the radial direction at a portion other than the slide portion between the piston and the cylinder even when the piston is positioned near the top dead center or the bottom dead center and therefore the elastic element cannot sufficiently support the movable element in the radial direction due to reduced rigidity.

Another object of the present invention is to provide an oscillation-type compressor capable of preventing the piston from colliding with the cylinder head or the exhaust valve when the movable element including the piston shifts toward the compression chamber due to the insufficient pressurization occurring immediately after the startup of the compressor or when the ambient air temperature is low.

Another object of the present invention is to provide an oscillation-type compressor capable of preventing the movable element from excessively shifting away from the compression chamber in response to extremely changed operating conditions.

In order to accomplish the above and other related objects, one aspect of the present invention provides an oscillation-type compressor comprising a tightly closed casing, a piston and a cylinder accommodated in the tightly closed casing, a motor including a stator and a mover, a stationary element including the cylinder and the stator of the motor, a movable element including the piston and the mover of the motor, an elastic element having a portion fixed to the movable element and another portion fixed to the stationary element, and a support mechanism for supporting the movable element in a radial direction when the piston is positioned near a top dead center position or a bottom dead center.

Another aspect of the present invention provides an oscillation-type compressor comprising a tightly closed casing, a piston and a cylinder accommodated in the tightly closed casing, a motor including a stator and a mover, a stationary element including the cylinder and the stator of the motor, a movable element including the piston and the mover of the motor, an elastic element having a portion fixed to the movable element and another portion fixed to the stationary element, and a position changing mechanism associated with the movable element for changing an axial position of the movable element.

It is preferable that this oscillation-type compressor further comprises a stopper for limiting an axial shift amount of the movable element changed by the position changing mechanism.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
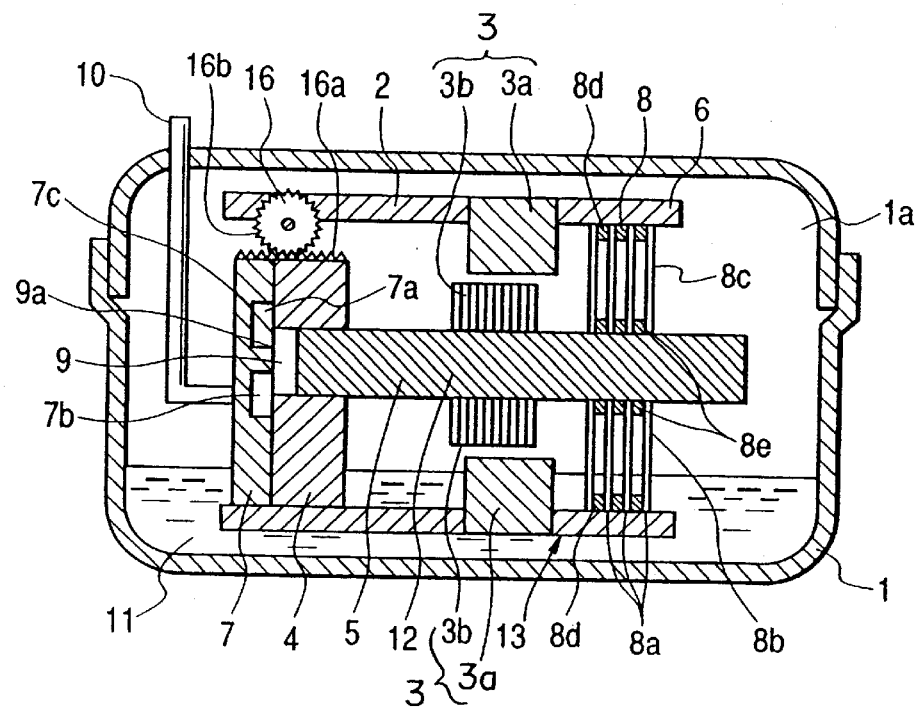
FIG. 1 is a vertical cross-sectional view showing an oscillation-type compressor in accordance with a first embodiment of the present invention.

Preferred embodiments of the present invention will be explained in more detail with reference to the attached drawings. Identical parts are denoted by the same reference numerals throughout the drawings.

First Embodiment

FIG. 1 is a vertical cross-sectional view showing an oscillation-type compressor in accordance with a first embodiment of the present invention.

The oscillation-type compressor comprises a tightly closed casing 1 having an inside space 1a for storing coolant gas and a main body 2. A motor 3 includes a stator 3a and a mover 3b. The mover 3b is fixed to a piton 5. The main body 2 is roughly constituted by a movable element 12 and a stationary element 13. The movable element 12 includes the mover 3b of the motor 3 and the piston 5. The stationary element 13 includes a cylinder 4, the stator 3a of the motor 3 and a block 6. The main body 2 is elastically supported by a suspension spring (not shown) in the tightly closed casing 1. Lubrication oil 11 is stored in the lower portion of the tightly closed casing 1.

An elastic element 8 comprises a plurality of elastic members 8a stacked or multilayered in an axial direction and spaced via intervening radially outer spacers 8d and an radially inner spacers 8e. An inner cylindrical edge 8b of each elastic element 8 is fixed to the piston 5. An outer cylindrical edge 8c of the elastic element 8 is fixed to the block 6.

The cylinder 4 and the elastic element 8 cooperatively support the piston 5 so as to be slidable and reciprocate in the axial direction. The cylinder 4 and the piston 5 cooperatively define a compression chamber 9.

Next, compression mechanism of the above-described oscillation-type compressor will be explained. First, alternating current of an AC power source is half-wave rectified and supplied to the stator 3a. A magnetic field generated by the stator 3a attracts the mover 3b fixed to the piston 5 based on the principle of magnetic variable resistance. When the mover 3b shifts in the axial direction, the elastic element 8 disposed between the mover 3b and the block 6 resiliently deforms in response to the shift movement of the piston 5, storing an elastic force therein. When the elastic force stored in the elastic element 8 is sufficiently increased, the mover 3b is pushed back to the original position. Continuous repetition of this cycle reciprocates the piston 5 in the axial direction.

Coolant gas of a cooling system (not shown) is introduced into a low-pressure chamber 7a of a cylinder head 7, and then enters the compression chamber 9 of the cylinder 4 via an intake valve (not shown) disposed in the cylinder head 7. The coolant gas introduced in the compression chamber 9 is compressed by the piston 5 which reciprocates in the above-described manner.

The compressed coolant gas then enters a high-pressure chamber 7b of the cylinder head 7 via an exhaust valve (not shown), and then exits the cylinder head 7 to the cooling system.

According to the first embodiment, the cylinder 4 is integral with the cylinder head 7 and shiftable in the axial direction with respect to the block 6 when driven by a shifting device 16. The shifting device 16 comprises a rack 16a provided on an axially extending surface of the cylinder 4. A pinion 16b, rotatably supported to the stationary element 13, such as the block 6, meshes with the rack 16a so as to a constitute a rack-and-pinion mechanism. Thus, the first embodiment provides the shifting device 16 for flexibly shifting the piston 5 in the axial direction with respect to the block 6.

Operation of the oscillation-type compressor in accordance with the first embodiment will be explained hereinafter.

During a compressing operation of the compressor, the cooling power can be reduced by lowering the voltage applied to the motor 3 so as to reduce the stroke of the piston 5.

In this case, the top clearance of the piston 5 may increase in proportion to reduction of the piston stroke. However, according to the first embodiment, the shifting device 16 can shift the cylinder 4 toward the compression chamber 9 so as to reduce the volume of the compression chamber 9, thereby canceling the increased top clearance and maintain the top clearance at a constant value. Thus, re-expansion loss is reduced and efficiency can be maintained adequately.

Furthermore, when an increased cooling power is required, an increased voltage is applied to the motor 3 so as to increase the stroke of the piston 5. In this case, the top clearance decreases due to the increased stroke of the piston 5. The piston 5 may collide with the cylinder head 7. However, according to the first embodiment, the shifting device 16 can shift the cylinder 4 away from the compression chamber 9 so as to increase the volume of the compression chamber 9, thereby canceling the reduced top clearance and preventing the piston 5 from colliding with the cylinder head 7.

As described above, the first embodiment provides the oscillation-type compressor comprising the tightly closed casing 1 having the inside space 1a for storing coolant gas, the block 6 accommodated in the tightly closed casing 1, the motor 3 including the stator 3a and the mover 3b, the piston 5 connected to the mover 3b of the motor 3, the movable element 12 including the mover 3b of the motor 3 and the piston 5, the stationary element 13 including the stator 3a of the motor 3 and the block 6, the elastic element 8 having a portion fixed to the movable element 12 and another portion fixed to the stationary element 8, the cylinder 4 shiftable in the axial direction with respect the block 6, and the shifting device 16 for shifting the cylinder 4 in the axial direction. With this arrangement, it becomes possible to minimize the top clearance adequately in accordance with a given piston stroke. The compressor can be always operated with better efficiencies.

Second Embodiment

Figure 2:
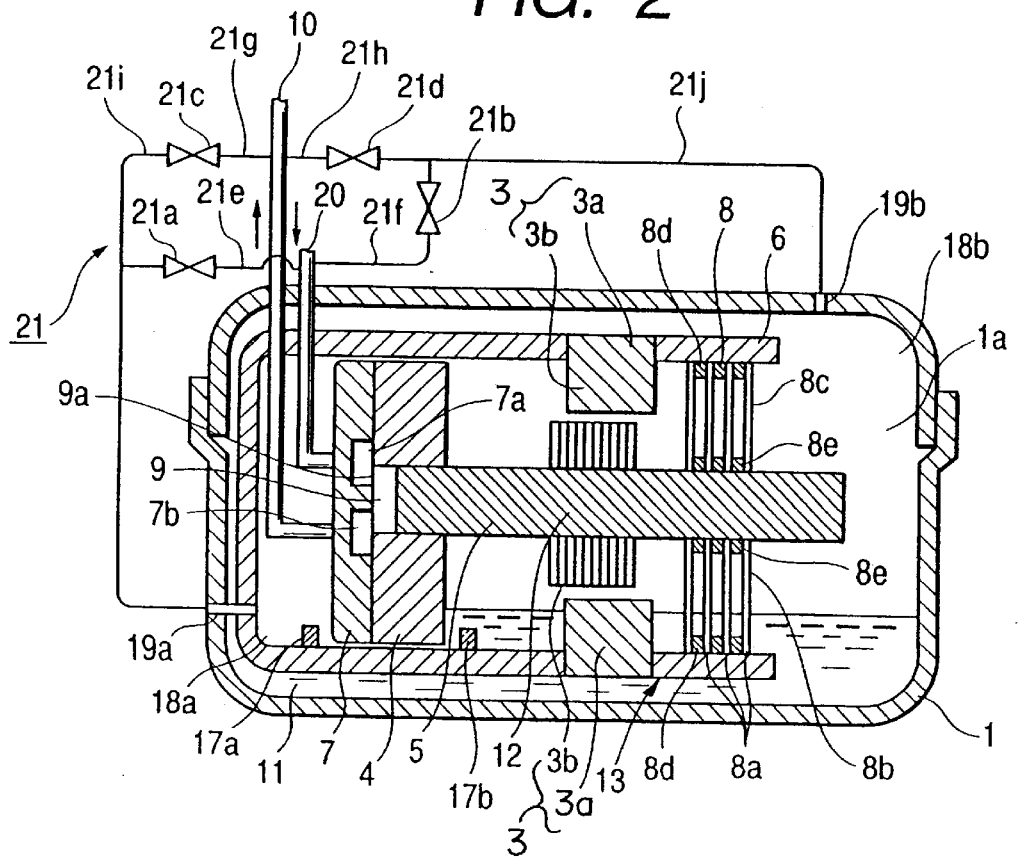
FIG. 2 is a vertical cross-sectional view showing an oscillation-type compressor in accordance with a second embodiment of the present invention.

FIG. 2 is a vertical cross-sectional view showing an oscillation-type compressor in accordance with a second embodiment of the present invention.

In FIG. 2, the cylinder 4 is put between two stopper projections 17a and 17b provided on an inner surface of the block 7 so that the cylinder 4 can shiftable in the axial direction with respect to the block 7 in a limited range restricted by the stopper projections 17a and 17b. Two back-pressure chambers 18a and 18b, formed in the tightly closed casing 1 and airtightly partitioned by the integral unit of the cylinder 4 and the cylinder head 7, communicate with the outside via back-pressure pipes 19a and 19b, respectively. An intake pipe 20 directly extends from the cylinder head 7 to the outside of the tightly closed casing 1.

A pressure control mechanism 21 is disposed between the back-pressure chambers 19a, 19b and intake and exhaust pipes 20 and 10. More specifically, the pressure control mechanism 21 comprises a total of four pressure control valves 21a, 21b, 21c and 21d. Connecting pipes 21e and 21f extend from the intake pipe 20 to the pressure control valves 21a and 21b, respectively. Connecting pipes 21g and 21h extend from an exhaust pipe 10 to the pressure control valves 21c and 21d, respectively. A pressure pipe 21i connects the pressure control valves 21a and 21c to the back-pressure pipe 19a. A pressure pipe 21j connects the pressure control valves 21b and 21d to the back-pressure pipe 19b.

Operation of the oscillation-type compressor in accordance with the second embodiment will be explained hereinafter.

The pressure control mechanism 21 introduces the low pressure gas from the intake pipe 20 and the high pressure gas from the exhaust pipe 10 and adjusts the pressures of the introduced gases by the pressure control valves 21a, 21b, 21c and 21d to produce adjusted gases having arbitrary pressures in a range from the original high pressure to the original low pressure. The adjusted gases are supplied into the back-pressure chambers 18a and 18b.

When the ambient air temperature is high, an increased cooling power is required. In such a case, the pressure control valve 21c is closed while the pressure control valve 21a is opened. Thus, the back-pressure chamber 18a is held at a low pressure level.

Meanwhile, the pressure control valve 21d is opened and the pressure control valve 21b is closed. Thus, the pressure of the back-pressure chamber 18b is increased to a high level. The cylinder 4, which is integral with the cylinder head 7, shifts in the axial direction toward the stopper projection 17a due to a pressure imbalance between the back-pressure chambers 18a and 18b.

In this case, the top clearance of the piston 5 increases in accordance with the shift movement of the cylinder 4. However, the increased top clearance can be canceled by applying an increased voltage to the motor 3 so as to increase the piston stroke. Thus, the second embodiment makes it possible to maintain the top clearance at a constant value.

Accordingly, it becomes possible to automatically increase the stroke of the piston in response to a high ambient air temperature so that the cooling power can be sufficiently obtained even in such a high load condition. Thus, efficient compressor operation can be realized in accordance with the driving conditions of the cooling device without using additional detecting and control devices.

Next, when the ambient air temperature is low, a decreased cooling power is required. In such a case, the pressure control valve 21a is closed while the pressure control valve 21c is opened. Thus, the pressure of the back-pressure chamber 18a is increased to a high level.

Meanwhile, the pressure control valve 21b is opened and the pressure control valve 21d is closed. Thus, the back-pressure chamber 18b is held at a reduced low pressure level. The integral unit of the cylinder 4 and the cylinder head 7 shifts in the axial direction toward the other stopper projection 17b due to a reversed pressure imbalance between the back-pressure chambers 18a and 18b.

In this case, the top clearance of the piston 5 decreases in accordance with the shift movement of the cylinder 4. However, the decreased top clearance can be canceled by applying a decreased voltage to the motor 3 so as to decrease the piston stroke. Thus, the second embodiment makes it possible to maintain the top clearance at the constant value.

Accordingly, it becomes possible to automatically decrease the stroke of the piston in response to a low ambient air temperature. Thus, efficient compressor operation can be realized in accordance with the driving conditions of the cooling device without using additional detecting and control devices.

As described above, the second embodiment of present invention provides the oscillation-type compressor comprising the tightly closed casing 1 having the inside space 1a for storing coolant gas, the block 6 accommodated in the tightly closed casing 1, the motor 3 including the stator 3a and the mover 3b, the piston 5 connected to the mover 3b of the motor 3, the movable element 12 including the mover 3b of the motor 3 and the piston 5, the stationary element 13 including the stator 3a of the motor 3 and the block 6, the elastic element 8 having one portion 8b fixed to the movable element 12 and another portion 8c fixed to the stationary element 13, the cylinder 4 shiftable with respect the block 6, the cylinder head 7 fixed to the cylinder 4, back-pressure chambers 18a and 18b formed in the coolant gas space 1a and airtightly partitioned by an integral unit including at least one of the cylinder 4 and the cylinder head 7, and at least one of the back-pressure chambers 18a, 18b being held at a low pressure level and another one of the back-pressure chambers 18a, 18b being held at a high pressure level. With this arrangement, it becomes possible to realize a practical cooling device, such as a refrigerator, which is capable of automatically increasing the stroke of the piston in response to a high ambient air temperature so that the cooling power can be sufficiently obtained even in the high load condition and is also capable of automatically reducing the stroke of the piston in response to a decreased ambient air temperature. Thus, efficient compressor operation can be realized in accordance with the driving conditions of the cooling device without using additional detecting and control devices.

Although the second embodiment of the present invention discloses the pressure control mechanism 21 which controls the pressures in the back-pressure chambers 18a and 18b. However, in is needless to say that similar effects can be obtained even when the pressure control mechanism 21 is replaced by any other comparable pressure control device.

Third Embodiment

Figure 3:
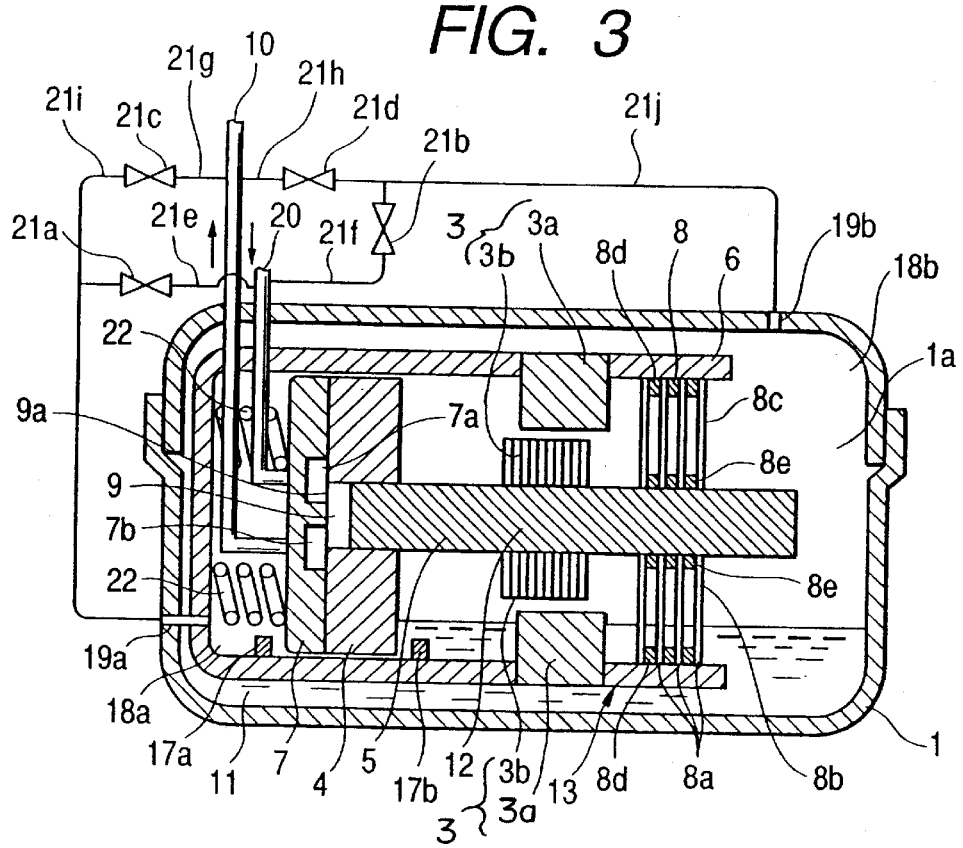
FIG. 3 is a vertical cross-sectional view showing an oscillation-type compressor in accordance with a third embodiment of the present invention.

FIG. 3 is a vertical cross-sectional view showing an oscillation-type compressor in accordance with a third embodiment of the present invention.

As shown in FIG. 3, an elastic member 22 resiliently holds or supports the integral unit of the cylinder 4 and the cylinder head 7 midway between two stopper projections 17a and 17b.

Operation of the oscillation-type compressor in accordance with the third embodiment will be explained hereinafter.

When a large voltage is suddenly applied to the motor 3, the piston 5 may collide with the cylinder head 7. Accordingly, during a start-up operation of the compressor, the voltage applied to the motor 3 is gradually increased to avoid the collision of the piston 5. In this case, the top clearance of the piston gradually decreases with a significant elapse of time until the pressure conditions of the system reach the predetermined values.

However, according to the third embodiment of the present invention, the elastic member 22 resiliently holds or supports the cylinder 4 at a position closer to the top dead center of the piston 5 when the compressor is stopped. Thus, even when the compressor is driven with a smaller stroke during the start-up operation, the top clearance can be maintained at a smaller value by the elastic member 22.

Subsequently, the pressure of the compressed air increases and the piston stroke increases responsively. The cylinder 4 is gradually pushed toward the stopper projection 17a by the compression force, while the elastic member 22 resiliently receives or supports the cylinder 4 so as to maintain the top clearance at a constant value. Thus, the pressure conditions of the system can quickly reach the predetermined optimum values, realizing efficient compressor operation.

When the compressor is operated stably, the cylinder 4 may oscillate together with the piston 5. However, the elastic member 22 acts as a damping means for suppressing the oscillation of the cylinder 4. Thus, the third embodiment reduces the fluctuation of the top clearance of the piston 5 caused by the co-oscillation between the piton 5 and the cylinder 4, preventing the cooling power from deteriorating. Furthermore, the third embodiment can stabilize the position of the cylinder 4 and suppress the vibration and noise.

As described above, according to the third embodiment of the present invention, the oscillation-type compressor comprises the elastic member 22 having one end connected to the integral unit of the cylinder 4 and the cylinder head 7 and the other end connected to the stationary element 13. With this arrangement, it becomes possible to suppress the top clearance of the piston 5 to a small value even in the start-up operation where the piston is operated at short strokes, thereby realizing efficient compressor operation. Furthermore, it becomes possible to stabilize the cylinder position during an ordinary operation, when compared with a case where the cylinder position is controlled by a gas pressure imbalance. Thus, vibration and noise can be suppressed effectively.

Fourth Embodiment

Figure 4:
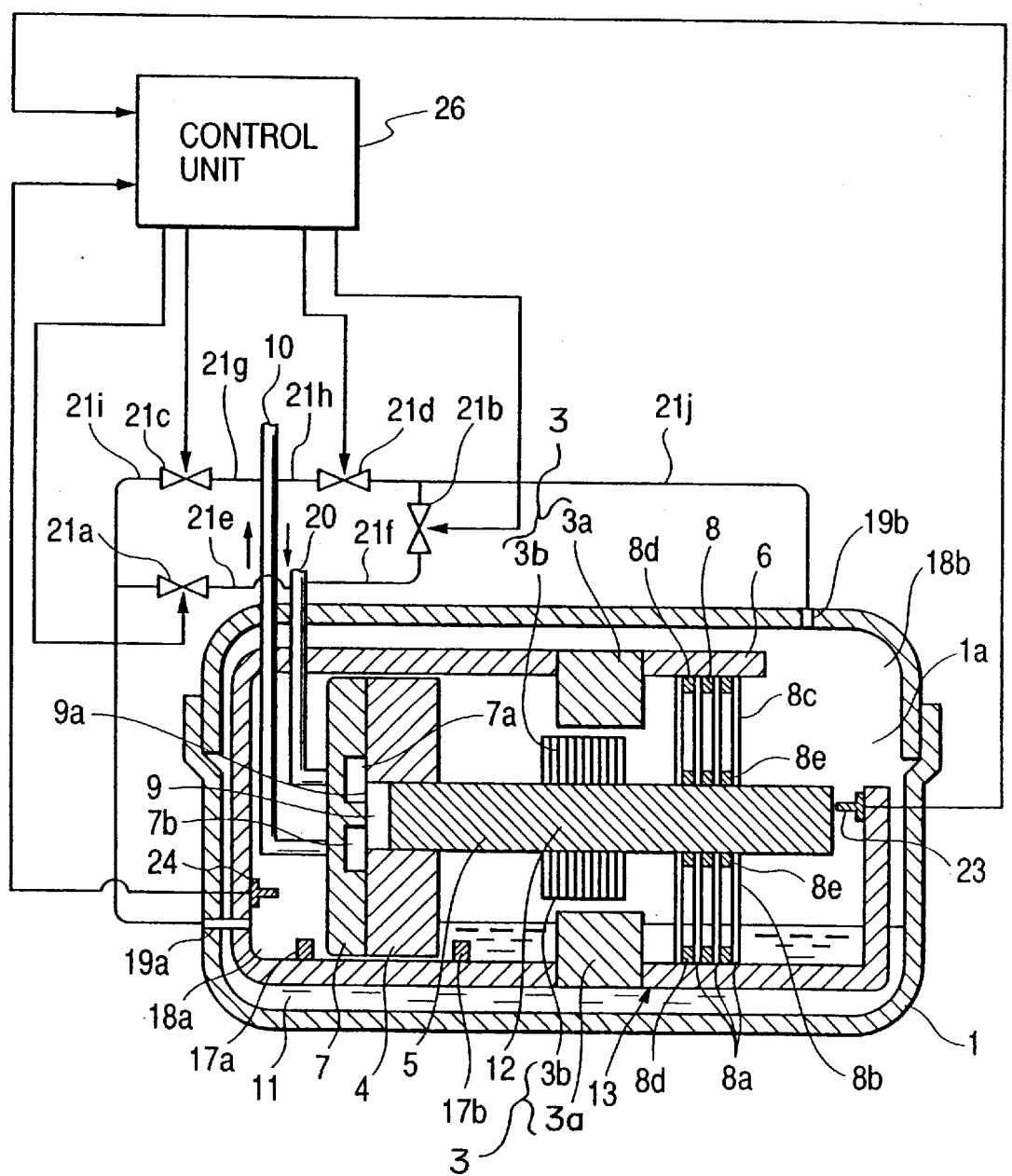
FIG. 4 is a vertical cross-sectional view showing an oscillation-type compressor in accordance with a fourth embodiment of the present invention.

FIG. 4 is a vertical cross-sectional view showing an oscillation-type compressor in accordance with a fourth embodiment of the present invention.

In FIG. 4, a sensor 23, detecting the position of the piston 5, is fixed to the block 6. Another sensor 24, detecting the position of the cylinder 4, is fixed to the block 6.

A control unit 26 receives the signals produced from the position detecting sensors 23 and 24, and controls the pressure control valves 21a, 21b, 21c and 21d.

Operation of the oscillation-type compressor in accordance with the fourth embodiment will be explained hereinafter.

When the stroke of piston 5 increases in response to changed operating pressure conditions of the compressor, the piston 5 may collide with the cylinder head 7. In this case, the control unit 26 feedback controls the pressure control mechanism 21 based on the signals sent from the position detecting sensors 23 and 24. More specifically, the pressure control valve 21c is closed, while the pressure control valve 21a is opened. Thus, the back-pressure chamber 18a is held at a low pressure level.

Meanwhile, the pressure control valve 21d is opened and the pressure control valve 21b is closed. Thus, the back-pressure chamber 18b is held at an increased high pressure level. The integral unit of the cylinder 4 and the cylinder head 7 shifts in the axial direction toward the stopper projection 17a due to a pressure imbalance between the back-pressure chambers 18a and 18b.

In this case, the top clearance of the piston 5 increases in accordance with the shift movement of the cylinder 4, preventing the piston 5 from colliding with the exhaust valve and eliminating noise.

The stroke of the piston 5 decreases in response to the operating pressure conditions of the compressor. In this case, the oscillation center of the piston shifts in a direction opposed to the compression chamber 9. As a result, the piston 5 cannot reach the top dead center due to the shifting of the oscillation center.

The position detecting sensors 23 and 24 continuously monitor the positions of the piston 5 and the cylinder 4, respectively. When an increased top clearance is detected based on the signals of the position detecting sensors 23 and 24, the controller 26 closes the pressure control valve 21a and opens the pressure control valve 21a to hold the back-pressure chamber 18a at an increased high pressure level.

Meanwhile, the controller 26 opens the pressure control valve 21b and closes the pressure control valve 21d. Thus, the back-pressure chamber 18b is held at a decreased low pressure level. The integral unit of the cylinder 4 and the cylinder head 7 shifts in the axial direction toward the stopper projection 17b due to a pressure imbalance between the back-pressure chambers 18a and 18b.

In this case, the top clearance of the piston 5 decreases in accordance with the shift movement of the cylinder 4. Thus, the piston position is always optimized with respect to the cylinder position. In other words, it becomes possible to minimize the top clearance, preventing the cooling power from deteriorating due to the increase of the top clearance. Efficient compressor operation can be realized.

As described above, according to the fourth embodiment of the present invention, the oscillation-type compressor of the present invention comprises the cylinder position detecting sensor 24 fixed to one of the stationary element 13 and the cylinder 4. With this arrangement, it becomes possible to optimize the piston position with respect to the cylinder position irrespective of changed operating pressure conditions, thereby minimizing the top clearance and realizing efficient compressor operation. Furthermore, it becomes possible to prevent the piston from colliding with the exhaust valve when the piston stroke is increased, thereby eliminating any damage and noise.

According to the above-described fourth embodiment, the control unit 26 feedback controls the pressure control mechanism 21 to stabilize the top clearance based on the position signals of the piston 5 and the cylinder 4. However, it is needless to say that similar effects can be obtained even when the feedback control is performed so as to adjust the stroke of the piston 5 by changing the voltage applied to the motor 3 based on the position signals of the piston 5 and the cylinder 4.

Fifth Embodiment

Figure 5:
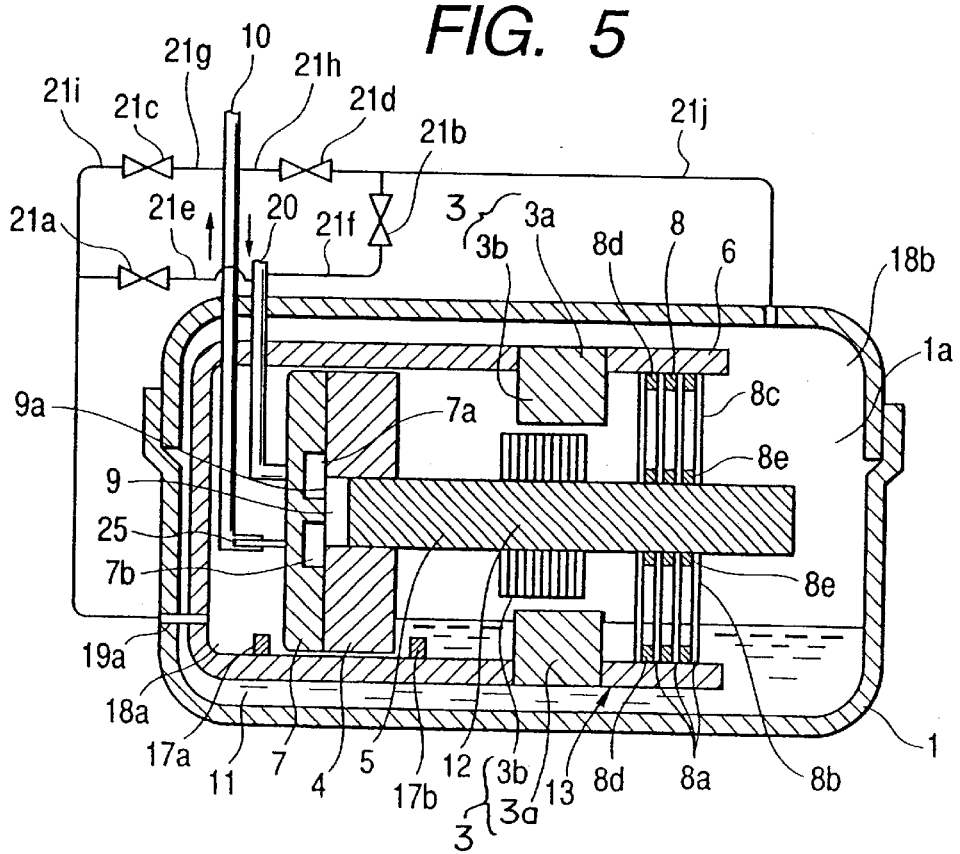
FIG. 5 is a vertical cross-sectional view showing an oscillation-type compressor in accordance with a fifth embodiment of the present invention.

FIG. 5 is a vertical cross-sectional view showing an oscillation-type compressor in accordance with a fifth embodiment of the present invention.

In FIG. 5, an auxiliary exhaust pipe 25, slidable in the axial direction, is coupled with the exhaust pipe 10.

Operation of the oscillation-type compressor in accordance with the fifth embodiment will be explained hereinafter.

When the piston 5 reciprocates in the cylinder 4, the compressor vibrates largely in the axial direction. The caused vibration, transmitted to the stationary element 13 of the compressor, largely vibrates the exhaust pipe 10 connecting the cylinder head 7 to the outside of the tightly closed casing 1.

However, according to the fifth embodiment of the present invention, the auxiliary exhaust pipe 25 is coupled with the exhaust pipe 10 and slidable in the axial direction so as to absorb caused vibration. Thus, no vibration is transmitted from the piston 5 to the exhaust pipe 10.

Accordingly, as no vibration is transmitted from the reciprocating piston 5 to the exhaust pipe 10, it becomes possible to reduce the repetitive stress applied on the exhaust pipe 10, thereby preventing the reliability from deteriorating due to the damage of the exhaust pipe 10.

As described above, the fifth embodiment of the present invention provides the oscillation-type compressor comprising the tightly closed casing 1 having the inside space 1a for storing coolant gas, the block 6 accommodated in the tightly closed casing 1, the motor 3 including the stator 3a and the mover 3b, the piston 5 connected to the mover 3b of the motor 3, the movable element 12 including the mover 3b of the motor 3 and the piston 5, the stationary element 13 including the stator 3a of the motor 3 and the block 6, the elastic element 8 having one portion 8b fixed to the movable element 12 and another portion 8c fixed to the stationary element 13, the cylinder 4 fixed to the block 6 or shiftable in the axial direction with respect the block 6, the cylinder head 7 fixed to the cylinder 4, the auxiliary pipe 25 having one end shiftable in the axial direction with respect to one of the exhaust pipe 10 and the intake pipe 20 and the other end fixed to one of the cylinder 4 and the cylinder head 7. With this arrangement, the exhaust or intake pipe can shift in the axial direction even when large vibration occurs in the axial direction, thereby reducing the large amplitude stress repetitively acting on the exhaust or intake pipe. Thus, it becomes possible to prevent the exhaust or intake pipe from being damaged. Even when the cylinder is shifted, it becomes possible to prevent the exhaust or intake pipe from being damaged.

The above-described fifth embodiment discloses the auxiliary exhaust pipe 25 shiftable in the axial direction. However, it is needless to say that similar effects can be obtained even when a similar arrangement is applied to the intake pipe 20.

Sixth Embodiment

Figure 6:
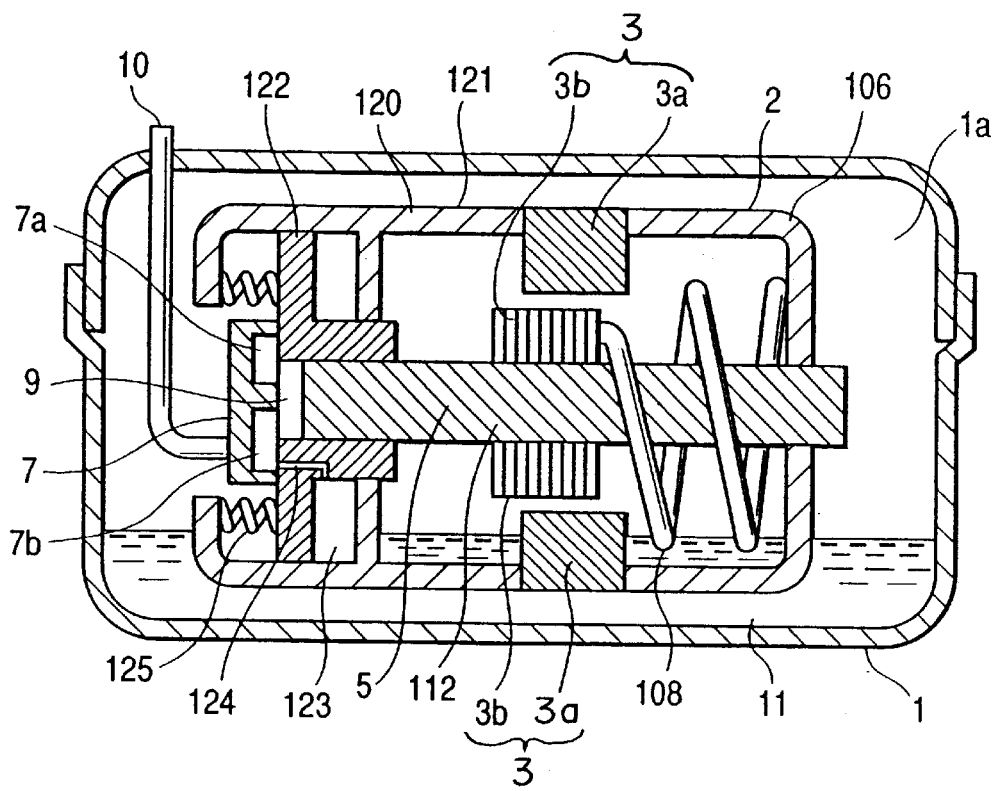
FIG. 6 is a vertical cross-sectional view showing an oscillation-type compressor in accordance with a sixth embodiment of the present invention.

FIG. 6 is a vertical cross-sectional view showing an oscillation-type compressor in accordance with a sixth embodiment of the present invention.

In FIG. 6, the oscillation-type compressor comprises a tightly closed casing 1 having an inside space serving as a coolant gas space 1a, a main body 2, a motor 3 including a stator 3a and a mover 3b, a cylinder 122, a piston 5, a yoke 106, a cylinder head 7, an intake chamber 7a, an exhaust chamber 7b, and an elastic element 108. The piston 5 has one end inserted in a bore of the cylinder 122 and has the other end held by the yoke 106 so as to reciprocate in the axial direction. A compression chamber 9 is defined by the cylinder 122, the piston 5 and the cylinder head 7. An exhaust pipe 10 extends from the exhaust chamber 7b formed in the cylinder head 7 to an outside cooling system (not shown). The main body 2 is roughly constituted by a movable element 112 and a stationary element 121. The movable element 112 includes the mover 3b of the motor 3 and the piston 5. The stationary element 121 includes the cylinder 122, the stator 3a of the motor 3 and the yoke 106. The main body 2 is elastically supported by a suspension spring (not shown) in the tightly closed casing 1. The elastic element 108 has one end fixed to the movable element 112 and the other end fixed to the stationary element 121. Lubrication oil 11 is stored in the lower portion of the tightly closed casing 1.

Next, compression mechanism of the above-described oscillation-type compressor will be explained. First, alternating current of an AC power source is half-wave rectified and supplied to the stator 3a. A magnetic field generated by the stator 3a attracts the mover 3b fixed to the piston 5 based on the principle of magnetic variable resistance. When the mover 3b shifts in the axial direction, the elastic element 108 disposed between the mover 3b and the yoke 106 resiliently deforms in response to the shift movement of the piston 5, storing an elastic force therein. When the elastic force stored in the elastic element 108 is sufficiently increased, the mover 3b is pushed back to the original position. Continuous repetition of this cycle reciprocates the piston 5 in the axial direction. In this reciprocative movement, a position of the piston 5 nearest to the cylinder head 7 is referred to as a top dead center while a position of the piston 5 farthest from the cylinder head 7 is referred to as a bottom dead center.

Coolant gas of the cooling system is first introduced into the coolant gas space 1a in the tightly closed casing 1, and then introduced into the intake chamber 7a formed in the cylinder head 7. Subsequently, the coolant gas enters the compression chamber 9 in the cylinder 4 via an intake valve (not shown) provided in the cylinder head 7. The coolant gas introduced in the compression chamber 9 is compressed by the piston 5 which reciprocates in the above-described manner.

The compressed coolant gas. enters the exhaust chamber 7b of the cylinder head 7 via an exhaust valve (not shown) provided in the cylinder head 7, and is then discharged to the cooling system via the exhaust pipe 10.

Part of the elastic element 108 soaks in the lubrication oil 11. The elastic element 108 responsive to the reciprocating piston 5 pumps up the lubrication oil 11. Thus, the lubrication oil 11 is supplied to slide portions of the piston 5 and the yoke 106.

The piston 5 receives a force derived from a pressure imbalance between the compression chamber 9 and the back-surface of the piston 5 in addition to a spring force of the elastic element 108 and a driving force of the motor 3. The oscillation center of the piston 5 shifts toward the bottom dead center in response to an increased pressure of the compression chamber. The oscillation amplitude of the piston 5 is increased.

In FIG. 6, a block 120, the stator 3a and the yoke 106 cooperatively constitute a stationary element 121. The cylinder 122 is coupled with the block 120 and slidable along an inner wall of the block 120 so as to reciprocate in the axial direction. An enclosed space 123 is formed between the cylinder 122 and the block 120. The piston 5 is coupled with the cylinder 122 and slidably along a bore wall formed in the cylinder 122 so as to reciprocate in the axial direction. A communication passage 124, formed in the cylinder 122, has one end connected to the exhaust chamber 7b and the other end connected to the closed space 123. A spring 125 interposes between the block 120 and the cylinder 122.

Operation of the oscillation-type compressor in accordance with the sixth embodiment will be explained hereinafter.

High-pressure coolant gas, compressed in the compression chamber 9 during the compressing operation of the compressor, is sent to the exhaust chamber 7b and then discharged to the cooling system via the exhaust pipe 10. At the same time, part of the pressurized coolant gas is introduced into the closed space 123 via the communication passage 124. The cylinder 122 receives a force derived from a pressure imbalance between the closed space 123 and the tightly closed casing 1. The cylinder 122 shifts toward the top dead center and stops at a balanced point where the force caused by the pressure imbalance balances with the spring force of the spring 125.

When the ambient temperature is high, the pressure of the closed space 123 increases to a higher level. Thus, the cylinder 122 shifts toward the top dead center than the usual position. By adjusting the motor power, the volume of the compression chamber 9 at the top dead center is maintained at the same value. The top dead center position of the piston 5 shifts away from the neutral position of the elastic element 108. Accordingly, the bottom dead center position shifts in the opposite direction with respect to the neutral position of the elastic element 108. As a result, the piston stroke increases and the exhaust amount of the coolant gas increases. The cooling power increased.

Furthermore, the sixth embodiment can reduce an area contacting with high-pressure gas compared with a case where the cylinder shifts in response to the high pressure acting on the entire back surface of the cylinder. This is effective to reduce the thermal loss.

Furthermore, under a condition where the cylinder receives a high pressure at its entire back surface, it is impossible to supply low-pressure lubrication oil from the bottom of the tightly closed casing to a high-pressure slide portion. However, according to the sixth embodiment, the high-pressure portion is limited to a smaller space. Thus, the lubrication oil can be pumped up by the movement of the elastic element soaked in the lubrication oil and supplied to the slide portions of the piston and the yoke.

As described above, the sixth embodiment of the present invention provides the oscillation-type compressor comprising the block 120 and the piston 5 accommodated in the tightly closed casing 1, the motor 3 including the stator 3a and the mover 3b, the movable element 112 including the mover 3a and the piston 5, the stationary element 121 including the block 120 and the stator 3a, the elastic element 108 having a portion fixed to the movable element 112 and another portion fixed to the stationary element 121, the cylinder 122 accommodating the piston 5 so that the piston 5 is shiftable in the axial direction, the cylinder 122 being inserted in the block 120 so as to reciprocate in the axial direction with the closed space 123 formed between the block 120 and the cylinder 122, the cylinder head 7 comprising the exhaust chamber 7b and attached to the cylinder 122, and the communication passage 124 connecting the closed space 123 and the exhaust chamber 7b. With this arrangement, it becomes possible to increase the piston stroke by causing the cylinder to shift toward the top dead center in response to the increased high pressure of the space when the ambient temperature is high and therefore the required cooling power is high. Thus, the cooling power can be increased. Furthermore, this arrangement can reduce an area contacting with high-pressure gas compared with a case where the cylinder shifts in response to the high pressure acting on the entire back surface of the cylinder. This is effective to reduce the thermal loss. Furthermore, according to this arrangement, the lubrication oil stored in the lower part of the tightly closed casing can be pumped up by the movement of the movable element. Thus, the lubrication oil can be easily supplied to the slide portions, with reduced slide loss and eliminated wear.

According to the above-described sixth embodiment, the spring is disposed between the cylinder and the block. However, it is needless to say that the similar effects will be obtained when the spring is replaced by a comparable element, such as a magnet, capable of generating a reaction force for varying the cylinder position in response to the changed pressure of the space.

Furthermore, the cylinder 122 is subjected to a variable load in accordance with the changed pressure of the compression chamber 9 during one stroke. This variable load may shift the cylinder 122 widely, reducing the volume of the compression chamber 9 at the bottom dead center and deteriorating the cooling power. Therefore, it is preferable that the cross section of the closed space 123 is sufficiently larger than that of the compression chamber 9. Furthermore, to suppress the shift amount of the cylinder during one stroke, it is preferable to use the spring 125 having a large spring coefficient.

Seventh Embodiment

Figure 7:
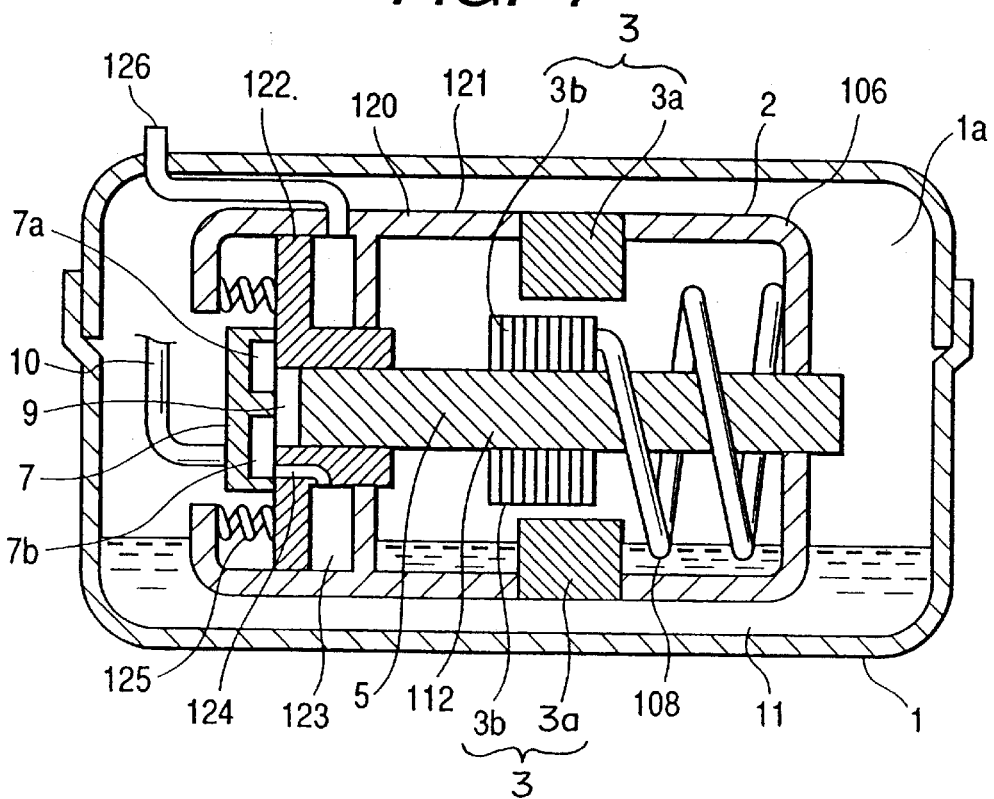
FIG. 7 is a vertical cross-sectional view showing an oscillation-type compressor in accordance with a seventh embodiment of the present invention.

FIG. 7 is a vertical cross-sectional view showing an oscillation-type compressor in accordance with a seventh embodiment of the present invention.

In FIG. 7, an exhaust pipe 126 extends from the closed space 123 to the cooling system located outside the compressor.

The seventh embodiment comprises the exhaust pipe 126 in addition to the arrangement of the sixth embodiment. According to the seventh embodiment, the exhaust chamber 7b communicates with the cooling system via the closed space 123.

Operation of the oscillation-type compressor in accordance with the seventh embodiment will be explained hereinafter.

The high-pressure coolant gas, compressed in the compression chamber 9 during the compressing operation of the compressor, is sent to the exhaust chamber 7b and then discharged to the closed space 123 via the communication passage 124. The closed space 123 acts as a muffler for reducing the flowing speed of the discharged coolant gas. The decelerated coolant gas is then sent to the cooling system via the exhaust pipe 126.

The amount of the coolant gas discharged from the compression chamber 9 increases in accordance with an increased ambient temperature. However, the volume of the closed space 123 increases in response to the increased exhaust gas amount so as to suppress the pulsation in the closed space 123, thereby preventing noise and vibration.

As described above, the seventh embodiment of the present invention provides the oscillation-type compressor further comprising the exhaust pipe 126 connecting the closed space 123 and the cooling system. With this arrangement, the coolant gas compressed in the compression chamber 9 is once expanded in the closed space 123 and then discharged to the cooling system. Accordingly, when the exhaust gas amount increases in response to an increased stroke, the volume of the closed space 123 increases correspondingly so as to act as a muffler. Thus, the pulsation is surely reduced, while noise and vibration can be suppressed.

Eighth Embodiment

Figure 8:
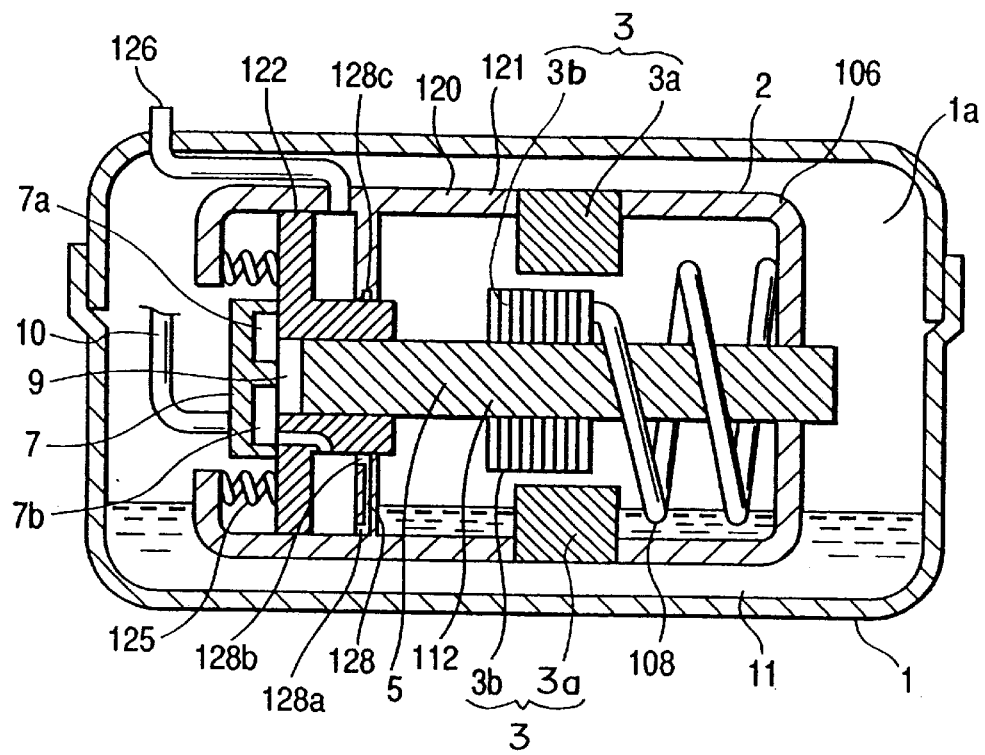
FIG. 8 is a vertical cross-sectional view showing an oscillation-type compressor in accordance with an eighth embodiment of the present invention.

FIG. 8 is a vertical cross-sectional view showing an oscillation-type compressor in accordance with an eighth embodiment of the present invention.

In FIG. 8, a radially extending passage 128 is provided in the block 120. A radially outer end 128a of the passage 128 is connected to the lower part of the closed space 123. A radially inner end 128b is connected to a ring groove 128c extending along the slide surface between the cylinder 122 and the block 120.

The eighth embodiment differs from the seventh embodiment in that the passage 128 is additionally provided.

Operation of the oscillation-type compressor in accordance with the eighth embodiment will be explained hereinafter.

The high-pressure coolant gas, compressed in the compression chamber 9 during the compressing operation of the compressor, is sent into the exhaust chamber 7b and then discharged to the closed space 123 via the communication passage 124. The flowing speed of the coolant gas is reduced in the closed space 123 so that the lubrication oil mist contained in the decelerated coolant gas falls by gravity and gathers at the bottom of the closed space 123. The lubrication oil thus stored in the lower part of the closed space 123 is pumped up via the radially extending passage 128 from the one end 128a to the other end 128b and supplied to the ring groove 128c. The supplied lubrication oil lubricates the entire slide surface between the cylinder 122 and the block 120. Thus, the clearance between the cylinder 122 and the block 120 is completely sealed by the lubrication oil so as to improve airtightness. Thus, it becomes possible to eliminate leaking loss. Furthermore, forming an oil film between the cylinder 122 and the block 120 prevents any wear occurring at the slide surface between the cylinder 122 and the block 120.

As described above, the eighth embodiment of the present invention provides the oscillation-type compressor further comprising the passage 128 connecting the slide surface between the cylinder 122 and the block 120 and the bottom of the closed space 123. With this arrangement, it becomes possible to supply lubrication oil from the bottom of the closed space 123 to the slide surface between the cylinder 122 and the block 120 via the passage 128. Thus, the slide surface is airtightly sealed by the supplied lubrication oil. It becomes possible to prevent the coolant gas from leaking from the closed space. Supplying the lubrication oil to the slide surface can prevent the cylinder and the block from wearing.

Ninth Embodiment

Figure 9:
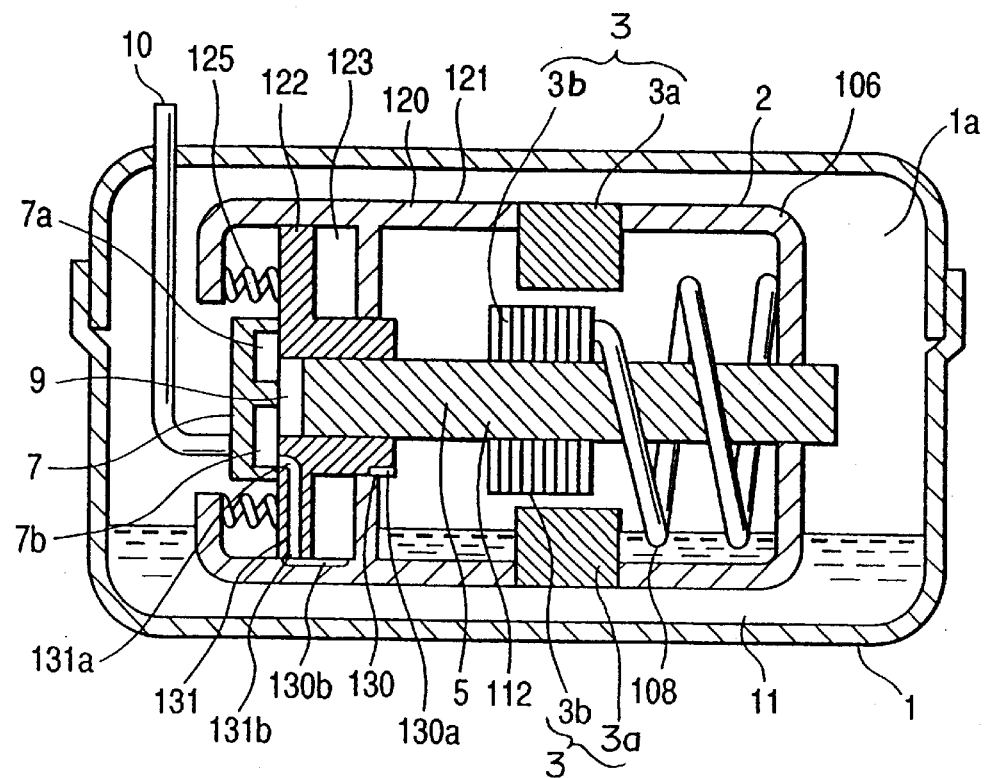
FIG. 9 is a vertical cross-sectional view showing an oscillation-type compressor in accordance with a ninth embodiment of the present invention.
Figure 10:
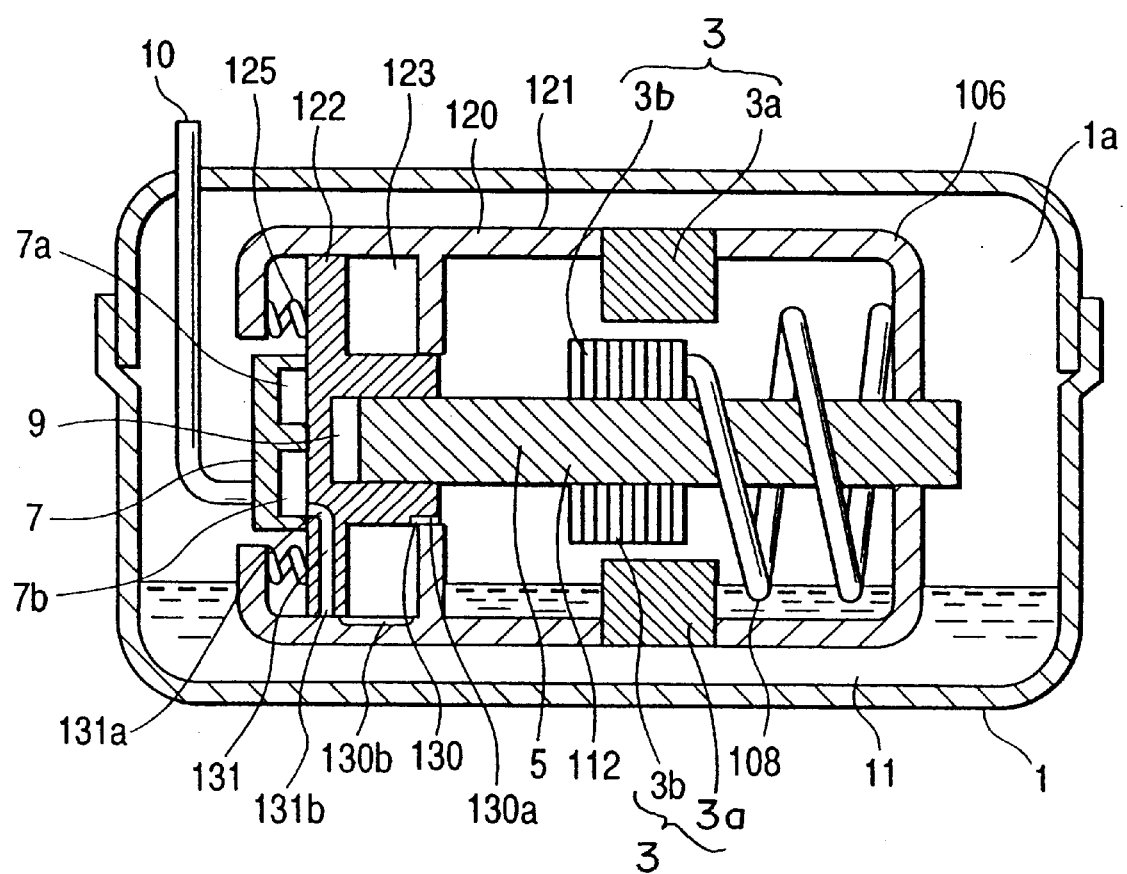
FIG. 10 is a vertical cross-sectional view showing an operated condition of the oscillation-type compressor in accordance with the ninth embodiment of the present invention.

FIG. 9 is a vertical cross-sectional view showing an oscillation-type compressor in accordance with a ninth embodiment of the present invention. FIG. 10 is a vertical cross-sectional view showing an operated condition of the oscillation-type compressor in accordance with the ninth embodiment.

In FIGS. 9 and 10, a combined groove 130 is provided on a slide surface of the cylinder 122 or the block 120. A groove 130a is provided on the cylinder 122, and another groove 130b is provided on the block 120. A communication passage 131 has one end 131a connected to the exhaust chamber 7b of the cylinder head 7 and another end 131b facing the groove 130b formed on the cylinder 122.

The ninth embodiment differs from the sixth embodiment in that the communication passage 124 is omitted and the groove 130 and the communication passage 131 are additionally provided.

Operation of the oscillation-type compressor in accordance with the ninth embodiment will be explained hereinafter.

The high-pressure coolant gas, compressed in the compression chamber 9 during the compressing operation of the compressor, is sent into the exhaust chamber 7b and then discharged to the cooling system via the exhaust pipe 10. At the same time, part of the pressurized coolant gas is introduced into the closed space 123 via the communication passage 131 and the groove 130b. When the ambient temperature increases, the pressure of the closed space 123 increases to a higher level. The cylinder 122 receives an increased pressure of the closed space 123 and shifts toward the top dead center. The piston 5 has an increased stroke.

However, when the system is in an unstable start-up condition or when the ambient temperature is extraordinarily increased, the exhaust pressure may increase extraordinarily to shift the cylinder 122 excessively toward the top dead center. However, according to the ninth embodiment of the present invention, when the cylinder 122 shifts toward the top dead center, the open end 131b of the communication passage 131 is dislocated from the groove 130b so as to disconnect the closed space 123 from the exhaust chamber 7b. Accordingly, introduction of the high-pressure coolant gas into the closed space 123 is stopped. At the same time, the closed space 123 communicates with the inside space of the tightly closed casing 1 via the groove 130a so as to discharge the coolant gas out of the closed space 123. As a result, the pressure level of the closed space 123 is reduced. The movement of the cylinder 122 shifting toward the top dead center is suppressed within a predetermined range. Thus, it becomes possible to prevent the piston stroke from excessively increasing, while causing no problems in the reliability of the elastic element or the like.

As described above, the ninth embodiment of the present invention provides the oscillation-type compressor further comprising the combined groove 130 provided on the slide surface of one of the cylinder 122 and the block 120. With this arrangement, when the cylinder 122 widely shifts toward the top dead center, the groove 130 acts as a means for discharging the pressurized gas from the closed space 123 so that the piston stroke can be maintained within a predetermined range. Accordingly, it becomes possible to prevent the piston stroke from excessively increasing, while causing no problems in the reliability of the elastic element or the like.

Tenth Embodiment

Figure 11:
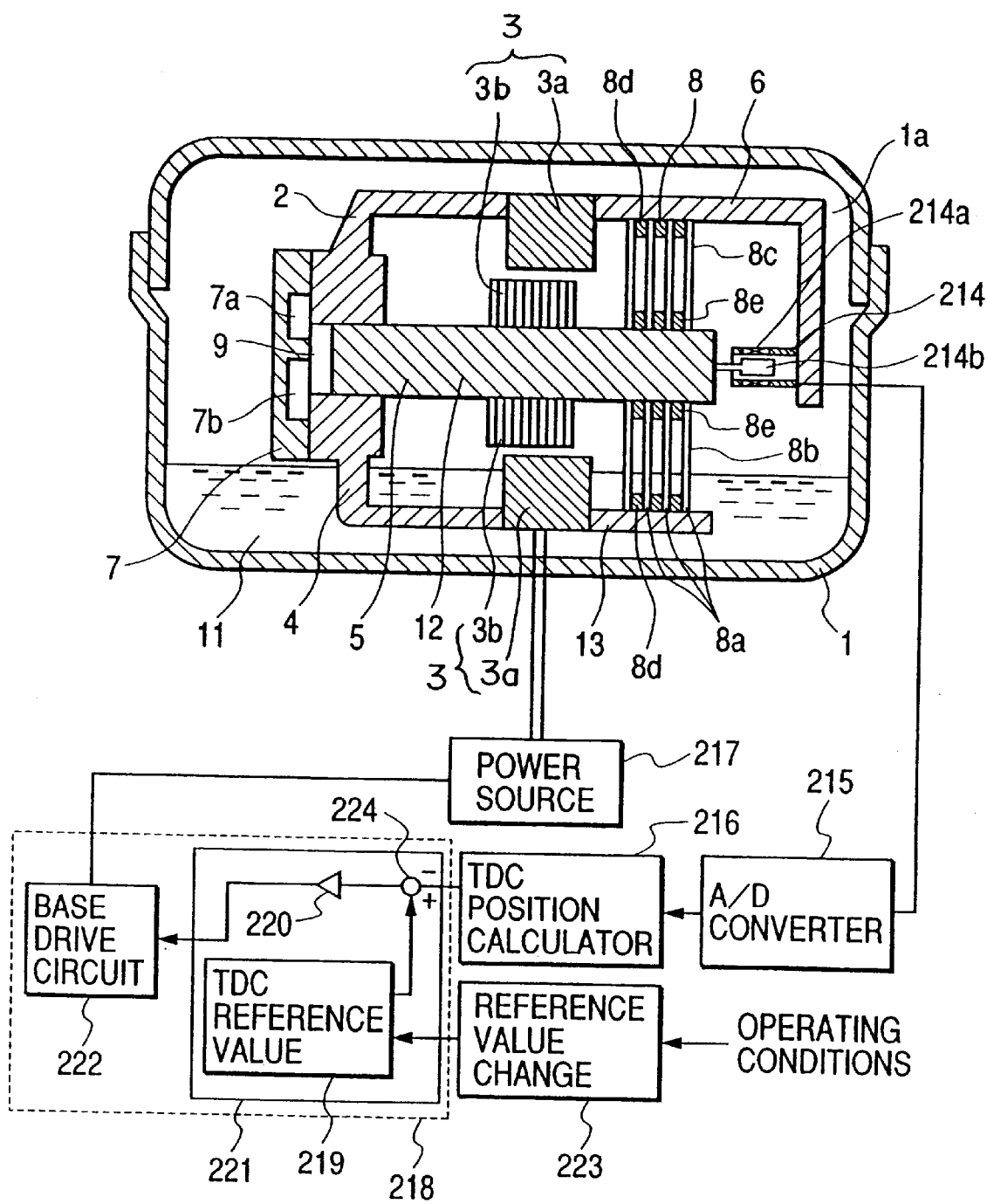
FIG. 11 is a vertical cross-sectional view showing an arrangement of an oscillation-type compressor in accordance with a tenth embodiment of the present invention.
Figure 12:
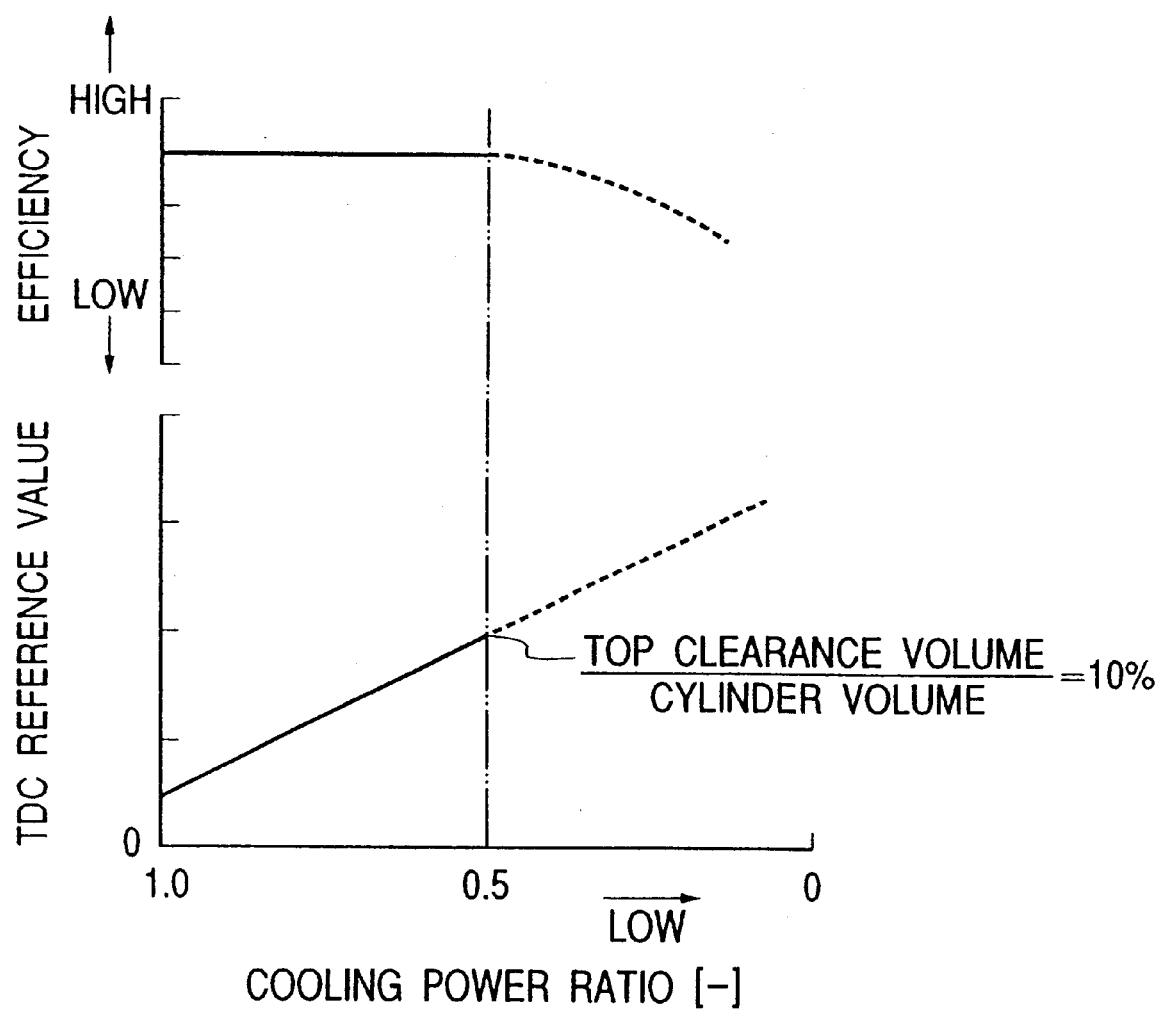
FIG. 12 is a graph showing characteristics of the oscillation-type compressor in accordance with the tenth embodiment of the present invention.

FIG. 11 is a view showing an arrangement of an oscillation-type compressor in accordance with a tenth embodiment of the present invention. FIG. 12 is a view showing characteristics of the oscillation-type compressor in accordance with the tenth embodiment of the present invention.

In FIG. 11, the oscillation-type compressor comprises a tightly closed casing 1 and a main body 2. The tightly closed casing 1 has an inside space serving as a coolant gas space 1a. A motor 3 includes a stator 3a and a mover 3b. The mover 3b is fixed to a piton 5. The main body 2 is roughly constituted by a movable element 12 and a stationary element 13. The movable element 12 includes the mover 3b of the motor 3 and the piston 5. The stationary element 13 includes a cylinder 4, the stator 3a of the motor 3 and a block 6. The main body 2 is elastically supported by a suspension spring (not shown) in the tightly closed casing 1. Lubrication oil 11 is stored in the lower portion of the tightly closed casing 1.

The cylinder 4 and an elastic element 8 cooperatively support the piston 5 so as to be slidable and reciprocate in the axial direction. A compression chamber 9 is defined by the cylinder 4 and the piston 5.

A piston position detecting sensor 214, constituted by a differential transformer including a coil 214a and a core 214b, detects the position of the piston 5 and generates an analog signal representing the same. This analog signal is converted into a digital signal by an A/D converter 215, and then supplied to a top dead center position calculator 216. An output of the top dead center position calculating unit 216 is supplied to a reciprocative movement controller 221 provided in an amplitude controller 18. An output of the reciprocative movement controller 221 is sent to a base drive circuit 222 which is connected to a power source 217.

Furthermore, the reciprocative movement controller 221 comprises a comparator 224 comparing the top dead center position signal generated from the top dead center position calculating device 216 with a top dead center reference value 219 stored in a memory (not shown) in the amplitude controller 218, and an amplifier 220 changes the amplitude of an output voltage sent to a base drive circuit 222.

Next, compression mechanism of the above-described oscillation-type compressor will be explained. First, alternating current of a commercial AC power source is supplied to the motor via the power source 217. A magnetic field generated by the stator 3a attracts the mover 3b fixed to the piston 5 based on the principle of magnetic variable resistance. When the mover 3b shifts in the axial direction, the elastic element 8 disposed between the mover 3b and the block 6 resiliently deforms in response to the shift movement of the piston 5, storing an elastic force therein. When the elastic force stored in the elastic element 8 is sufficiently increased, the mover 3b is pushed back to the original position. Continuous repetition of this cycle reciprocates the piston 5 in the axial direction.

The position of the piston 5, detected by the piston position detecting sensor 214 as an analog signal, is converted into a digital signal by the A/D converter 215 and supplied to the top dead center position calculating device 216 to obtain a top dead center position "A." The calculated top dead center position "A" is compared with the top dead center reference value 219. The amplifier 220 controls the amplitude of the output voltage supplied to the base drive circuit 222 in accordance with a comparison result so as to eliminate the difference between the calculated top dead center position "A" and the top dead center reference value 219. Accordingly, the piston 5 continuously repeats the reciprocative movement while keeping a constant top dead center position.

Coolant gas of a cooling system (not shown) is introduced into a low-pressure chamber 7a of a cylinder head 7, and then enters a compression chamber 9 of the cylinder 4 via an intake valve (not shown) disposed in the cylinder head 7. The coolant gas introduced in the compression chamber 9 is compressed by the piston 5 which reciprocates in the above-described manner.

The compressed coolant gas enters a high-pressure chamber 7b of the cylinder head 7 via an exhaust valve (not shown) disposed in the cylinder head 7, and then exits the cylinder head 7 to the cooling system.

Furthermore, a top dead center reference value changing device 223 is provided to change the top dead center reference value 219 in accordance with varied ambient air temperature and the pressure and load conditions of a cooling system (not shown).

Operation of the oscillation-type compressor in accordance with the tenth embodiment will be explained hereinafter.

During a compressing operation of the compressor, the output voltage of the power source 217 is feedback controlled in accordance with a difference between the measured top dead center position of the piston 5 and the top dead center reference value 219 preset in the amplitude controller 218 so as to eliminate the difference, thereby maintaining a constant top clearance.

However, the required cooling power reduces in response to changed external conditions, such as a reduced ambient air temperature and a reduced thermal load. In this case, the top dead center reference value changing device 223 selects a preferable value from a plurality of pre-memorized top dead center reference values in accordance with the required cooling power. Thus, the cooling power is variable in accordance with the varied external conditions relating to the ambient air temperature, the system pressure, the system temperature etc.

Thus, the above-described tenth embodiment increases the top clearance so as to suppress the cooling power of the compressor. This makes it possible to adjust the cooling power of the compressor in accordance with the required power of the cooling system, thereby preventing the cooling power from excessively increasing and realizing the efficient compressor operation.

FIG. 12 is a graph showing experimental data obtained by the inventors. As apparent from FIG. 12, the cooling power decreases with increasing top clearance of the piston 5 corresponding to the increased top dead center reference value 219. The compressor efficiency is substantially constant when a ratio of the top clearance volume to the cylinder volume is within 10%. However, the compressor efficiency starts decreasing when the ratio of the top clearance volume to the cylinder volume exceeds 10%.

As apparent from the experimental data shown in FIG. 12, the tenth embodiment makes it possible to reduce the cooling power to approximately 50% without deteriorating the compressor efficiency or the cooling system efficiency when the ratio of the top clearance volume to the cylinder volume is within 10%. Thus, it becomes possible to drive the compressor at an optimized power level in accordance with external conditions.

As described above, the tenth embodiment of the present invention provides the oscillation-type compressor comprising the tightly closed casing 1 having an inside space 1a for storing coolant gas, the cylinder 4 accommodated in the tightly closed casing 1, the motor 3 including the stator 3a and the mover 3b, the piston 5 connected to the mover 3b of the motor 3, the movable element 12 including the mover 3b of the motor 3 and the piston 5, the stationary element 13 including the stator 3a of the motor 3 and the cylinder 4, the elastic element 8 having a portion 8b fixed to the movable element 12 and another portion 8c fixed to the stationary element 13, the piton position detecting sensor 214 detecting the position of the piston 5, the top dead center position calculating means 216 for calculating the top dead center position of the piston 5 based on the piston position signal obtained from the piton position detecting sensor 214, the amplitude control means 218 for controlling the amplitude of the mover 3b in accordance with a difference between the top dead center position and a selected top dead center reference value 219, and the top dead center reference value changing means 223 for changing the top dead center reference value 219. With this arrangement, the top clearance of the piston 5 can be increased in response to a decreased ambient air temperature or a reduced load. Thus, the cooling power is suppressed without deterioration of the compressor efficiency. Thus, it becomes possible to realize an efficient compressor operation in accordance with the ambient air temperature change or the load change.

According to the above-described tenth embodiment, the motor 3 comprises the stator 3a and the mover 3b. However, it is needless to say that the similar effects will be obtained even when the motor 3 is replaced by a different motor which is capable of causing the piston 5 to reciprocate in the same manner.

Eleventh Embodiment

Figure 13:
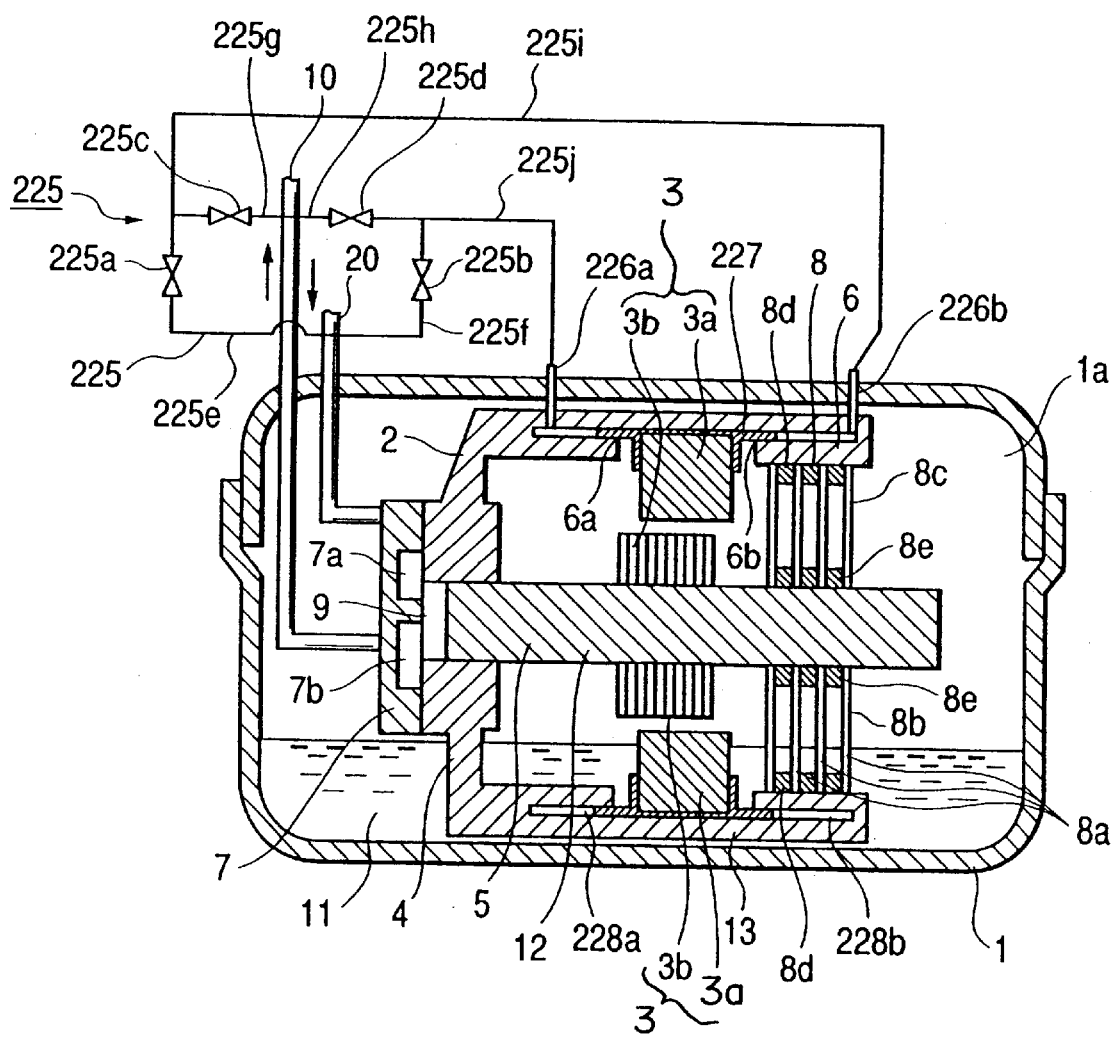
FIG. 13 is a vertical cross-sectional view showing an oscillation-type compressor in accordance with an eleventh embodiment of the present invention.

FIG. 13 is a vertical cross-sectional view showing an oscillation-type compressor in accordance with an eleventh embodiment of the present invention.

In FIG. 13, a movable stator base 227 is fixed to the stator 3a of the motor 3. The movable stator base 227 is coupled with the block 6 and shiftable in the axial direction with respect to the block 6. The movable stator base 227 and the block 6 cooperatively define two back-pressure chambers 228a and 228b located at both ends of the movable stator base 227 and communicated with the outside of the tightly closed casing 1. The back-pressure chambers 228a and 228b communicate with the outside of the tightly closed casing 1 via back-pressure pipes 226a and 226b, respectively. An intake pipe 20 extends from the outside of the tightly closed casing 1 to the cylinder head 7.

A pressure control mechanism 225 comprises a total of four pressure control valves 225a, 225b, 225c and 225d. Connecting pipes 225e and 225f extend from the intake pipe 20 to the pressure control valves 225a and 225b, respectively. Connecting pipes 225g and 225h extend from an exhaust pipe 10 to the pressure control valves 225c and 225d, respectively. A pressure pipe 225i connects the pressure control valves 225a and 225c to the back-pressure pipe 226b. A pressure pipe 225j connects the pressure control valves 225b and 225d to the back-pressure pipe 226a.

The pressure control mechanism 225 introduces the low pressure gas from the intake pipe 20 and the high pressure gas from the exhaust pipe 10 and adjusts the introduced high and low pressure gases by the pressure control valves 225a, 225b, 225c and 225d to produce adjusted gases having arbitrary pressures in a range from the introduced original high and low pressures.

Operation of the oscillation-type compressor in accordance with the eleventh embodiment will be explained hereinafter.

The oscillation center of the piston 5 shifts toward the compression chamber 9 in response to changed operating pressure conditions, such as a decreased ambient air temperature and a reduction of the gas pressure. The piston 5 may exceed the top dead center position and collide with the cylinder head 7.

In this case, the pressure control valve 225d is opened and the pressure control valve 225b is closed. Thus, the back-pressure chamber 228a is held at the high pressure. Furthermore, the pressure control valve 225c is closed and the pressure control valve 225a is opened. Thus, the back-pressure chamber 228b is held at the low pressure.

The movable stator base 227 and the stator 3a shift together toward an anti-compression side surface 6b of the block 6, i.e., in a direction opposed to the compression chamber 9 due to a pressure imbalance between the back-pressure chambers 228a and 228b.

Accordingly, the oscillation center of the piston 5 shifts in the direction opposed to the compression chamber 9 in response to the shift movement of the stator 3a of the motor 3. The top dead center position of the piston 5 also shifts in the direction opposed to the compression chamber 9. Thus, it becomes possible to prevent the piston 5 from colliding with the cylinder head 7, eliminating vibration and noise.

As described above, the eleventh embodiment of. the present invention provides the oscillation-type compressor comprising the tightly closed casing 1 having the inside space 1a for storing coolant gas, the cylinder 4 and the block 6 accommodated in the tightly closed casing 1, the motor 3 including the stator 3a and the mover 3b, the piston 5 connected to the mover 3b of the motor 3, the movable element 12 including the mover 3b of the motor 3 and the piston 5, the stationary element 13 including the stator 3a of the motor 3, the cylinder 4 and the block 6, the elastic element 8 having a portion 8b fixed to the movable element 12 and another portion 8c fixed to the stationary element 13, the stator 3a of the motor 3 or a movable stator base 227 connected to the stator 3a being partly coupled with the stationary element 13 so as to reciprocate in the axial direction in response to a pressure imbalance between back-pressure chambers 228a and 228b formed therebetween, and the pressure control mechanism 225 for controlling the pressures of the back-pressure chambers 228a and 228b. With this arrangement, the stator of the motor shifts in a direction opposed to the compression chamber when the top dead center position of the piston shifts toward the cylinder head in response to changed operating pressure conditions. Accordingly, the oscillation center of the piston shifts in the direction opposed to the compression chamber. Thus, it becomes possible to prevent the piston from colliding with the exhaust valve, eliminating vibration and noise.

Although the above-described eleventh embodiment discloses the pressure control mechanism 225 which controls the pressures of the back-pressure chambers 228a and 228b. However, it is needless to say that similar effects can be obtained even when the pressure control mechanism 225 is replaced by any other comparable pressure control device or a comparable mechanism for shifting the movable stator base 227 integrated with the stator 3a of the motor 3.

According to the above-described eleventh embodiment, the motor 3 comprises the stator 3a and the mover 3b. However, it is needless to say that the similar effects will be obtained even when the motor 3 is replaced by a different motor which is capable of causing the piston 5 to reciprocate in the same manner.

Twelfth Embodiment

Figure 14:
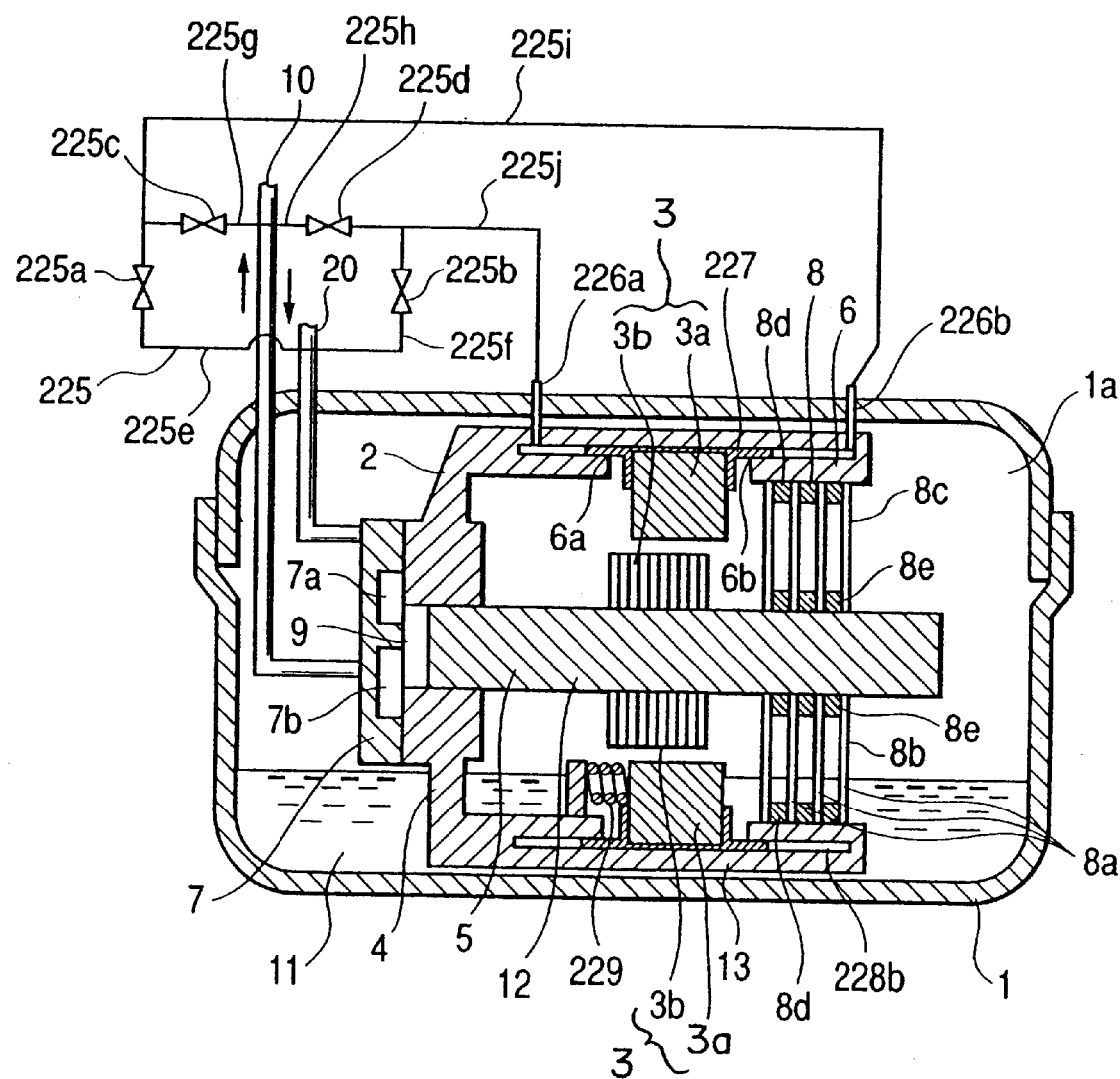
FIG. 14 is a vertical cross-sectional view showing an oscillation-type compressor in accordance with a twelfth embodiment of the present invention.

FIG. 14 is a vertical cross-sectional view showing an oscillation-type compressor in accordance with a twelfth embodiment of the present invention.

In FIG. 14, a shifting element 229 is provided for shifting the stator 3a in the axial direction, in addition to the arrangement of the eleventh embodiment.

Operation of the oscillation-type compressor in accordance with the twelfth embodiment will be explained hereinafter.

When the compressor is started up, the piston 5 causes a reciprocative movement in accordance with the current supplied to the motor 3. However, the compression chamber 9 is held at a low pressure immediately after the start-up operation of the compressor. Accordingly, the gas pressure acting on the piston 5 is so small that the piston 5 cannot shift sufficiently in the direction opposed to the compression chamber 9. In other words, the oscillation center of the piston 5 is dislocated toward the compression chamber 9. This may cause the piston 5 to collide with the exhaust valve of the cylinder head 7. However, according to the twelfth embodiment of the present invention, the shifting element 229 shifts the stator 3a of the motor 3 in the direction opposed to the compression chamber 9. Thus, during the start-up operation of the compressor, the oscillation center of the piston 5 can be positioned sufficiently far from the compression chamber 9.

Accordingly, it becomes possible to prevent the piston 5 from colliding with the cylinder head 7 during the start-up operation of the compressor, preventing the exhaust valve from being damaged and eliminating noise and vibration.

As described above, the twelfth embodiment of the present invention provides the oscillation-type compressor comprising the shifting means 229 for shifting the stator 3a of the motor 3 in a direction opposed to the compression chamber 9 when the compressor is stopped. With this arrangement, the motor stator shifts in the direction opposed to the compression chamber when the compressor is stopped. As the oscillation center of the piston during the start-up condition is shifted far from the compression chamber compared with that of the ordinary driving condition, it becomes possible to prevent the piston from colliding with the exhaust valve during the start-up operation, eliminating vibration and noise.

According to twelfth embodiment, the shifting element 229 is made of a spring. However, it is needless to say that the similar effects will be obtained even when the spring is replaced by any other comparable element which is capable of shifting the stator 3a in the axial direction.

Thirteenth Embodiment

Figure 15:
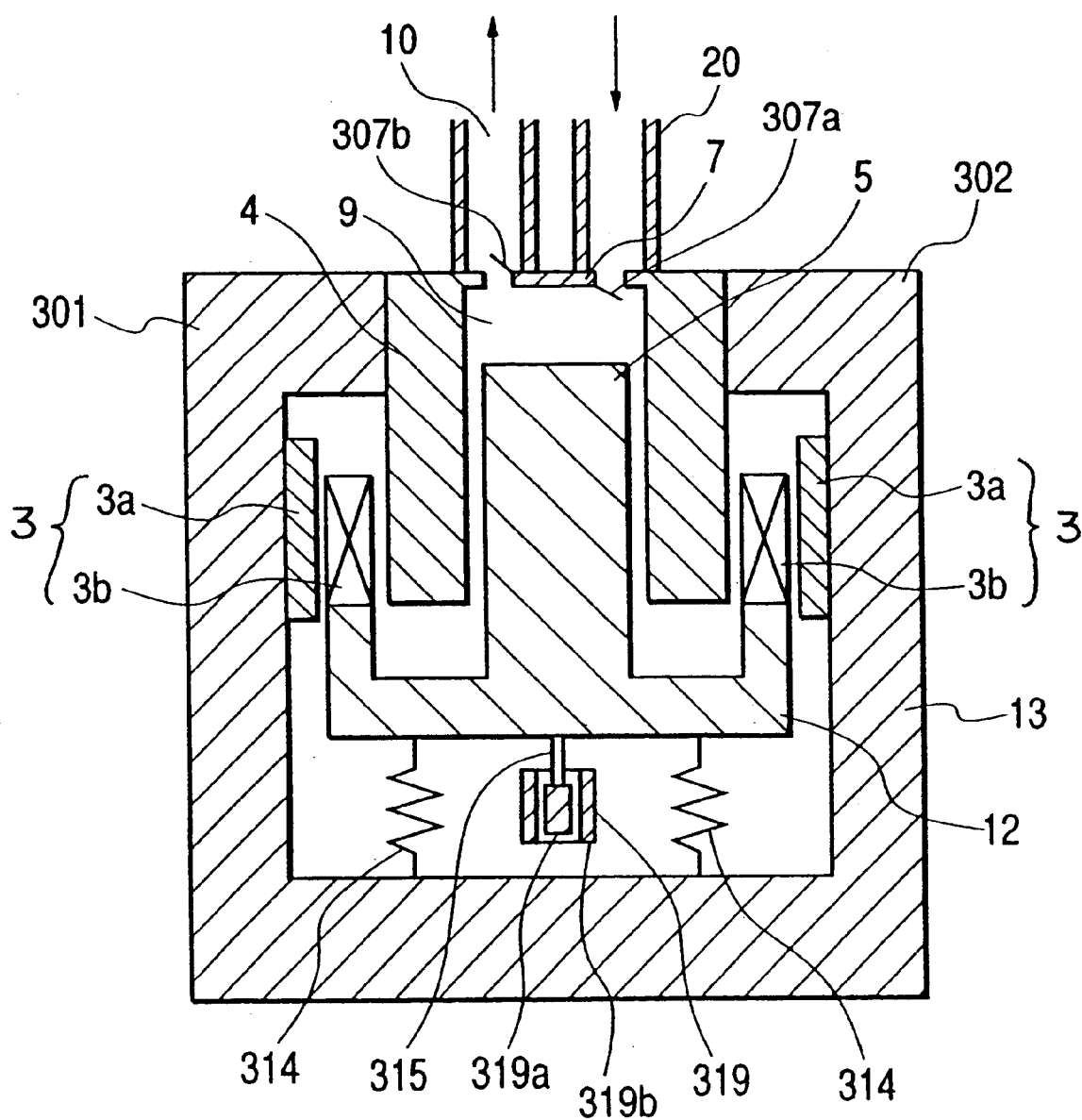
FIG. 15 is a vertical cross-sectional view showing an oscillation-type compressor in accordance with a thirteenth embodiment of the present invention.
Figure 16:
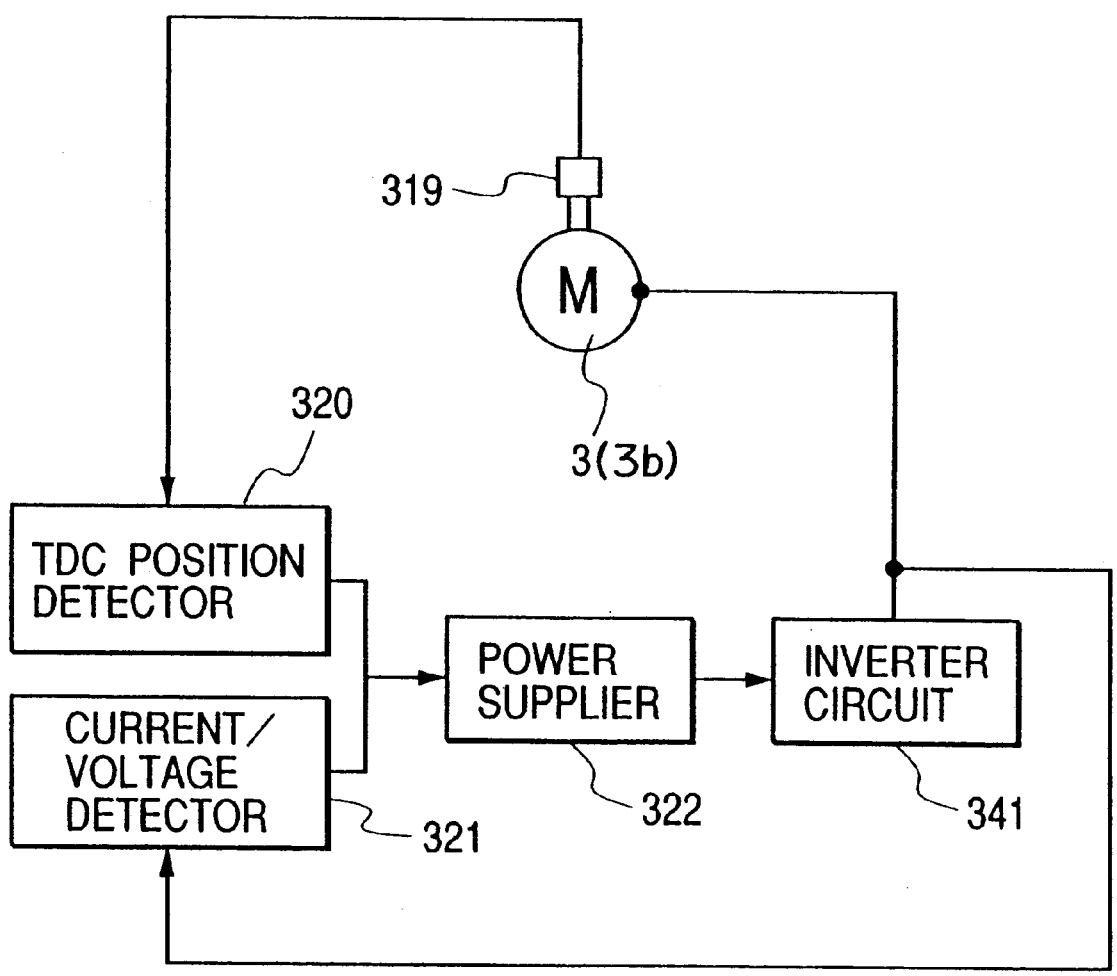
FIG. 16 is a diagram showing an electric circuit of the oscillation-type compressor in accordance with the thirteenth embodiment of the present invention.

FIG. 15 is a cross-sectional view showing an oscillation-type compressor in accordance with a thirteenth embodiment of the present invention. FIG. 16 is a diagram showing an electric circuit of the oscillation-type compressor in accordance with the thirteenth embodiment of the present invention.

In FIGS. 15 and 16, the oscillation-type compressor comprises a main body 301, a block 302, a motor 3 including a magnet serving as a stator 3a and a coil serving as a mover 3b, a cylinder 4, and a piston 5. A cylinder head 7 comprises an intake valve 307a and an exhaust valve 307b. The piston 5 is accommodated in the cylinder 4, so that the piston 5 reciprocates in an axial direction. The cylinder 4, the piston 5 and the cylinder head 7 cooperatively define a compression chamber 9. The compression chamber 9 is connected to an external cooling circuit (not shown) via an intake pipe 20 and an exhaust pipe 10.

The main body 301 is roughly constituted by a movable element 12 and a stationary element 13. The movable element 12 includes the piston 5 and the mover 3b of the motor 3. The stationary element 13 includes the cylinder 4 and the stator 3a of the motor 3. The main body 301 is elastically supported by a suspension spring (not shown) in the tightly closed casing (not shown). Each elastic element 314 has one end fixed to the movable element 12 and the other end fixed to the stationary element 13. A displacement detector 319 includes a core 319a and a coil 319b. The core 319a is connected to the movable element 12 via a connecting member 315 extending in the axial direction. The coil 319b is fixed to the stationary element 13 and has an inside space for accommodating the core 319a.

Coolant gas of the cooling system is introduced into the compression chamber 9 via the intake pipe 20 and the intake valve 307a. The coolant gas introduced in the compression chamber 9 is compressed by the piston 5 which reciprocates in the above-described manner. The compressed coolant gas is discharged via the exhaust valve 307b and the exhaust pipe 10 to the cooling system.

Next, compression mechanism of the above-described oscillation-type compressor will be explained. An inverter circuit 341 generates AC power which is supplied to the coil of the mover 3b fixed to the piston 5. An exited coil of the stator 3a generates a magnetic field. Being attracted in a direction crossing the magnetic field, the mover 3b reciprocates in the axial direction. The elastic element 314 resiliently deforms in response to the shift movement of the movable element 12, storing an elastic force therein. When the elastic force stored in the elastic element 314 is sufficiently increased, the movable element 12 is pushed back to the original position. Continuous repetition of this cycle reciprocates the piston 5 in the axial direction.

It is preferable that the frequency of the AC power generated by the inverter circuit 341 is equal to the resonant frequency of the system which is determined by the mass of the movable element 12 and a spring coefficient of the elastic element 314. With this setting, it becomes possible to effectively use the spring force of the elastic element 314 to cause the movable element 12 self-reciprocating.

Only when the piston 5 is positioned in the vicinity of the top dead center, the core 319a and the coil 319b cooperatively detect a displacement. Thus, the displacement detector 319 solely detects the top dead center position of the piston 5. A top dead center position detector 320 is provided for calculating the top dead center of the piston 5 based on a signal obtained from. the displacement detector 319.

A current/voltage detector 321 is provided for detecting current flowing across the motor 3 or voltage applied to the motor 3. A power supplier 322 is provided for changing the voltage applied to the motor 3 based on output signals of the top dead center position detector 320 and the current/voltage detector 321.

Operation of the oscillation-type compressor in accordance with the thirteenth embodiment will be explained.

The movable element 12 reciprocates together with the core 319a of the displacement detector 319. The core 319a is short because the detection range of the displacement detector 319 is limited to the vicinity of the top dead center of the piston 5. Accordingly, an overall weight of the movable element 12 including the core 319a is reduced, while the resonance frequency is increased and therefore an increased cooling power is obtained. Furthermore, reducing the weight of the reciprocating unit including the movable element 12 is effective to suppress the vibration.

Furthermore, limiting the detection range of the displacement detector 319 to the vicinity of the top dead center is effective to eliminate adverse influence of error factors and to accurately detect the position of the piston 5. The power supplier 322 decreases the output voltage of the inverter circuit 341 when the detected top dead center position is larger than a reference top dead center position and increases the output when the detected top dead center position is smaller than the reference top dead center position. Through this feedback control, the top dead center position of the piston 5 can be equalized to the reference top dead center. As the displacement detector 319 has high detection accuracy, it becomes possible to reduce and stabilize the deviation of the top dead center position with respect to the reference top dead center position. A small top clearance is obtained by setting an adequate reference top dead center position. Thus, the cooling ability is increased. The capability of accurately detecting the top dead center makes it possible to prevent the piston 5 from colliding with the cylinder head 7. Thus, it becomes possible to suppress collision noise and prevent the valve from being damaged.

Furthermore, the current/voltage detector 321 monitors current or voltage. This makes it possible to calculate the amplitude of the piston 5 based on the monitored current or voltage. Furthermore, the bottom dead center position is obtained by adding the calculated amplitude to the top dead center position detected by the top dead center position detector 320. Based on this result, the power supplier 322 decreases the voltage applied to the motor 3 when the obtained amplitude exceeds a preset value. Accordingly, it becomes possible to prevent the movable element 12 from oscillating with an excessively large amplitude, preventing the movable element 12 from colliding with the stationary element 13, and preventing the elastic element 314 from being excessively deformed and damaged.

As described above, the thirteenth embodiment of the present invention provides the oscillation-type compressor comprising the block 302 and the piston 5, the motor 3 including the stator 3a and the mover 3b, the movable element 12 including the mover 3b and the piston 5, the stationary element 13 including the block 302 and the stator 3a, the elastic element 314 having a portion fixed to the movable element 12 and another portion fixed to the stationary element 13, the cylinder 4 accommodating the piston 5 so as to allow the piston 5 reciprocating in the axial direction, the displacement detector 319 connected to the piston 5 in the axial direction for detecting the position near the top dead center of the piston 5, the top dead center position detecting means 320 for obtaining the top dead center position of the piston 5 based on the signal obtained from the displacement detector 319, the current/voltage detecting means 321 for detecting the current or voltage value of the motor 3, and the power supply means 322 for changing the voltage applied to the motor 3 based on output signals of the top dead center position detecting means 320 and the current/voltage detecting means 321. According to this arrangement, the displacement detector is only used for detecting the position near the top dead center of the piston. Downsizing the displacement detector is easy compared with the case where the displacement detector is used for detecting the entire amplitude of the piston. The movable element is light. The resonance frequency can be increased, while an increased cooling power is obtained.

Furthermore, as the usage of the displacement detector is limited to the detection of the position near the piston top dead center, it becomes possible to accurately detect the top dead center compared with the case where the displacement detector is used for detecting the entire amplitude. It becomes possible to suppress the fluctuation of the top clearance, thereby providing a reduced top clearance. The cooling power is increased, while it becomes possible to prevent the piston from colliding with the cylinder head. Furthermore, as the movable element is light due to the downsized displacement detector, it becomes possible to suppress the vibration caused by the reciprocative movement of the movable element. The piston amplitude detection is realized by detecting the current or voltage. It becomes possible to prevent the piston from oscillating with an excessively large amplitude, while preventing the movable element from colliding with the stationary element. The reliability of the elastic element can be maintained adequately so as not to be deteriorated by the excessive oscillation.

Fourteenth Embodiment

Figure 17:
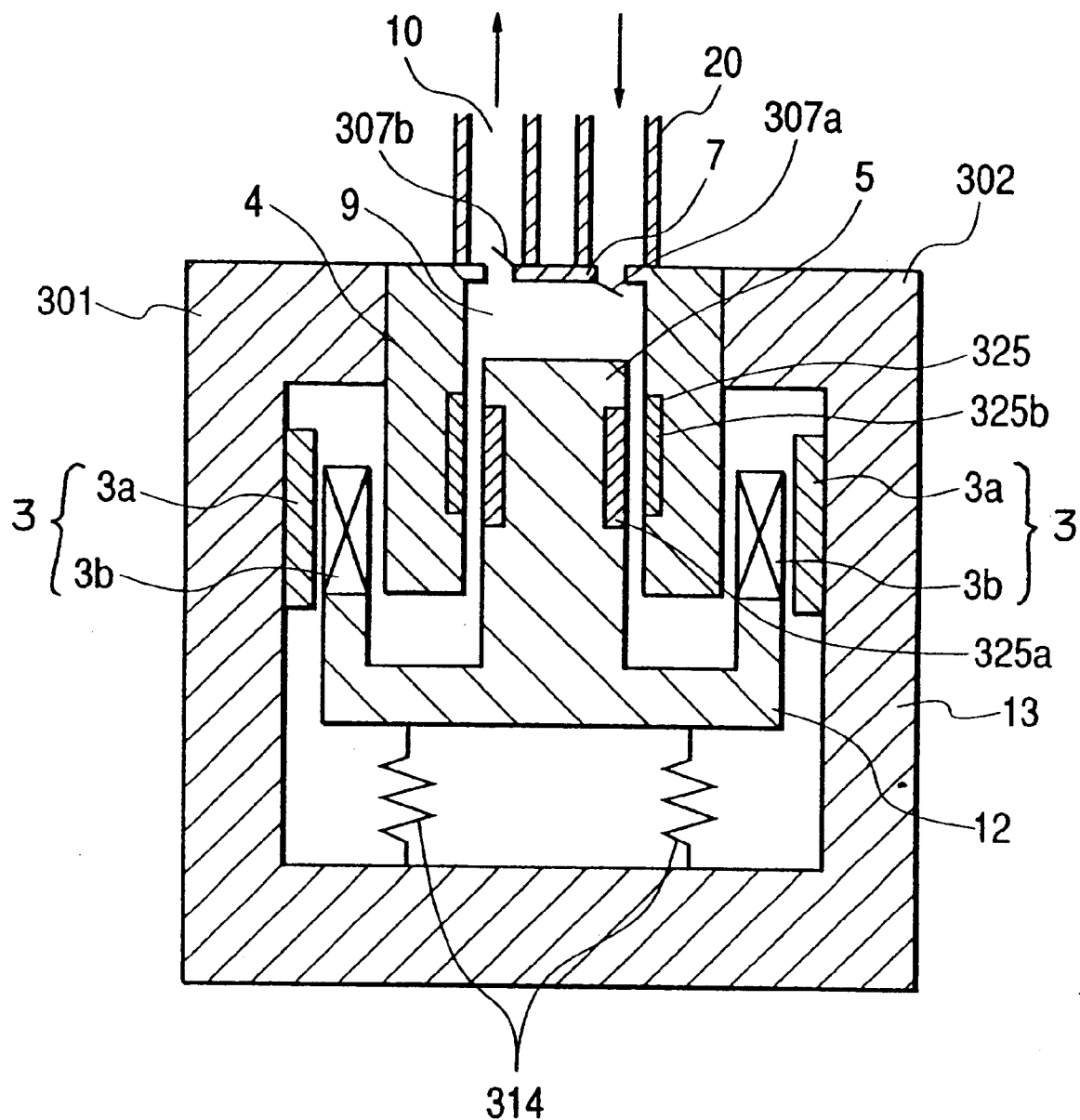
FIG. 17 is a vertical cross-sectional view showing an oscillation-type compressor in accordance with a fourteenth embodiment of the present invention.

FIG. 17 is a cross-sectional view showing an oscillation-type compressor in accordance with a fourteenth embodiment of the present invention.

In FIG. 17, a displacement detector 325 is disposed inside the stator 3a of the motor 3. A cylindrical core 325a is inserted in a recess formed on a slide surface of a piston 5. A coil 325b is inserted in a recess formed on a slide surface of a cylinder 4.

Operation of the oscillation-type compressor in accordance with the fourteenth embodiment will be explained. The core 325a of the displacement detector 325 is directly fixed to the piston 5 of the movable element 12. In other words, this arrangement requires no connecting parts used for fixing the displacement detector 325 to the movable element 12. Thus, the movable element 12 is light. The resonance frequency is increased, while the cooling power is increased. The weight-reduced movable element effectively eliminates the vibration caused by the reciprocative movement of the movable element.

The fourteenth embodiment disposes the displacement detector 325 midway on each slide surface of the piston 5 and the cylinder 4. However, it is needless to say that similar effects will be obtained when the displacement detector is located at an appropriate portion radially inward than the motor 3.

As described above, the fourteenth embodiment of the present invention provides the oscillation-type compressor comprising the block 302 and the piston 5, the motor 3 including the stator 3a and the mover 3b, the movable element 12 including the mover 3b and the piston 5, the stationary element 13 including the block 302 and the stator 3b, the elastic element 14 having a portion fixed to the movable element 12 and another portion fixed to the stationary element 13, the cylinder 4 accommodating the piston 5 so as to allow the piston 5 reciprocating in the axial direction, and the displacement detector 325 attached to the movable element 12 and the stationary element 13 at a radially inward portion with respect to the stator 3a of the motor 3. This arrangement requires no connecting parts used for fixing the displacement detector to the movable element. Thus, the movable element is light. The resonance frequency can be improved, while the cooling power is increased. The weight reduced movable element effectively eliminates the vibration caused by the reciprocative movement of the movable element.

Fifteenth Embodiment

Figure 18:
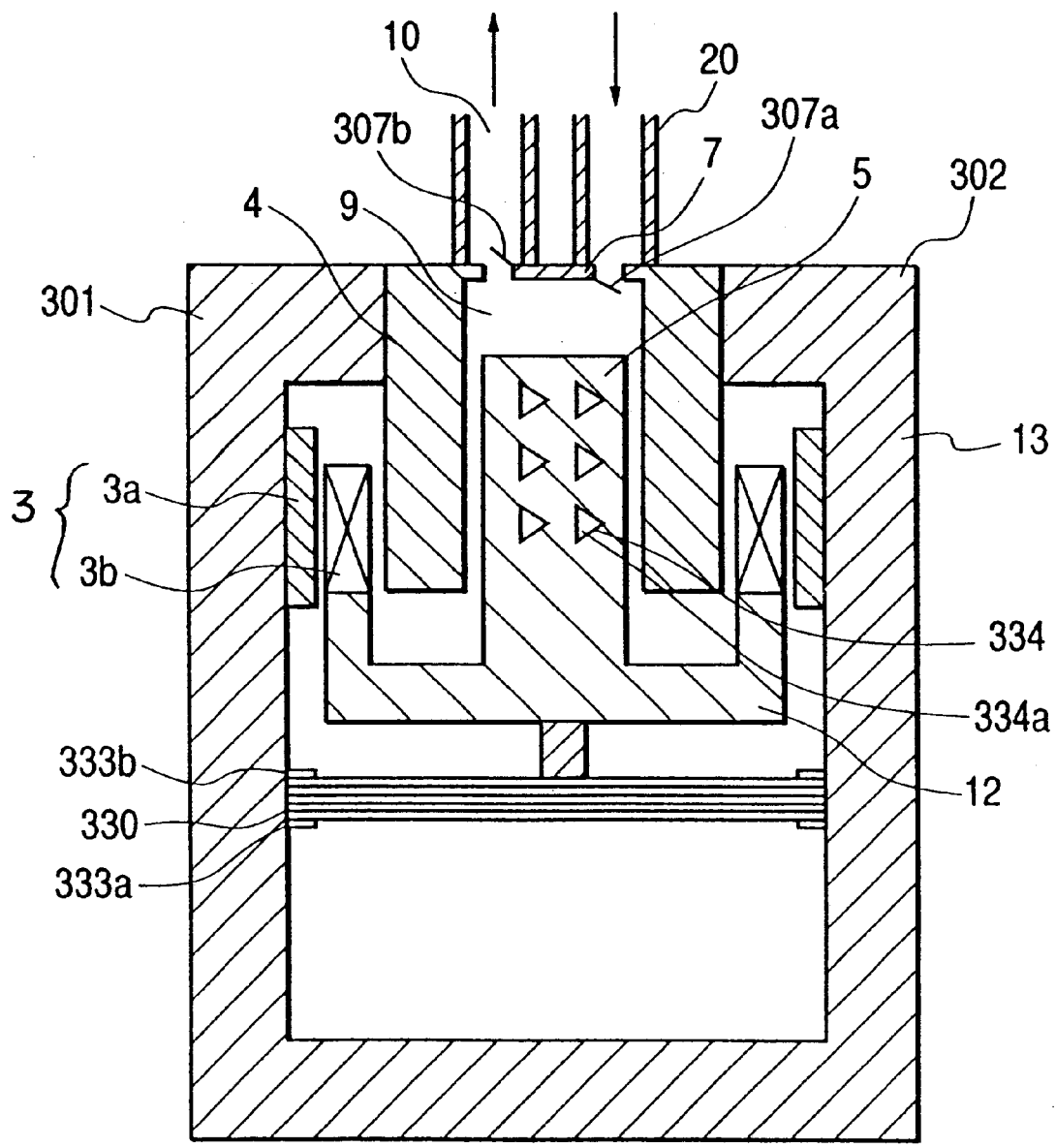
FIG. 18 is a vertical cross-sectional view showing an oscillation-type compressor in accordance with a fifteenth embodiment of the present invention.
Figure 19:
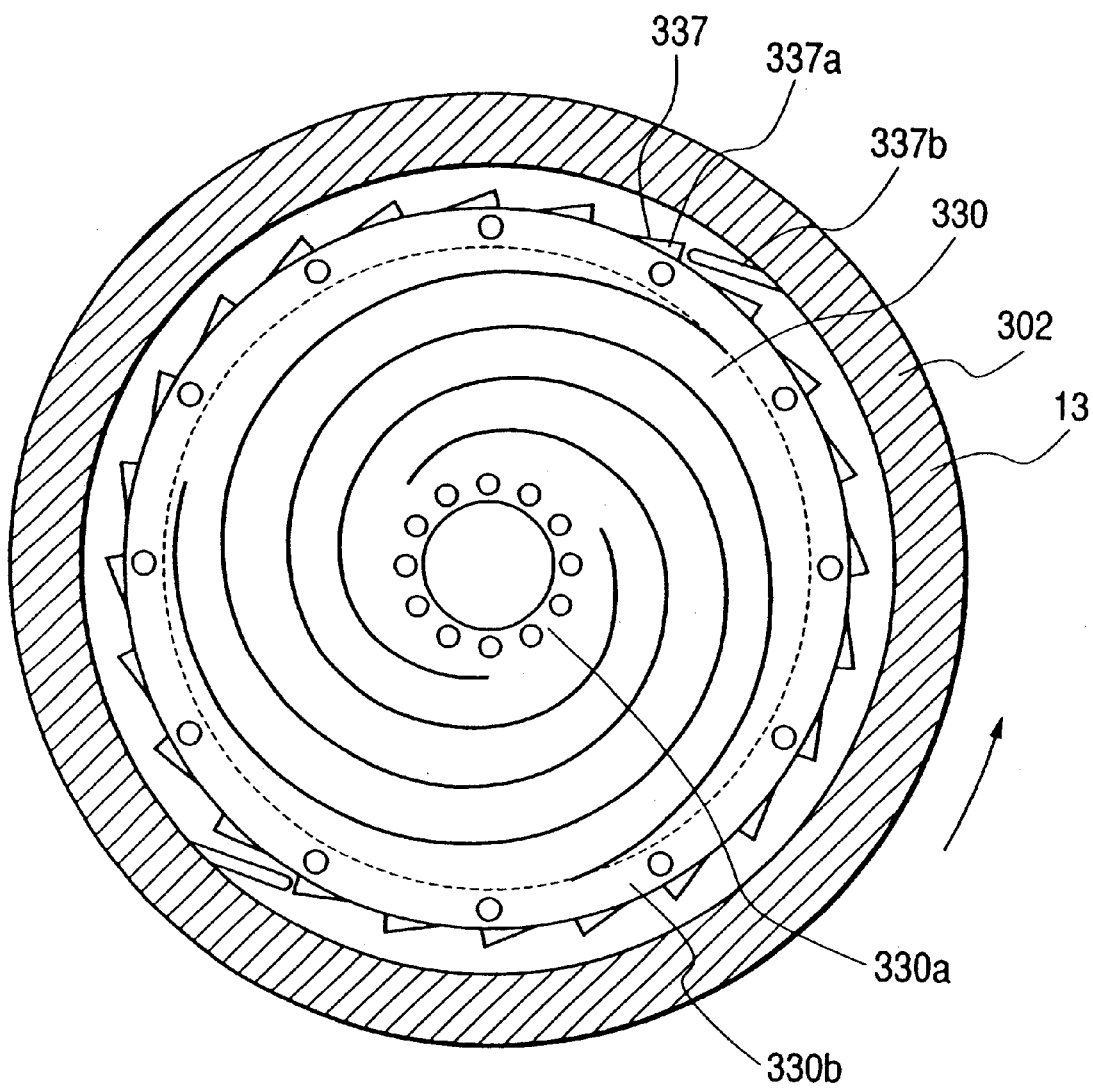
FIG. 19 is a plan view showing an elastic element used in the oscillation-type compressor in accordance with the fifteenth embodiment of the present invention.

FIG. 18 is a cross-sectional view showing an oscillation-type compressor in accordance with a fifteenth embodiment of the present invention. FIG. 19 is a cross-sectional view showing an essential arrangement of the oscillation-type compressor in accordance with the fifteenth embodiment of the present invention.

In FIGS. 18 and 19, a spiral elastic element 330 has a radially inner portion 330a fixed to a movable element 12. A radially outer portion 330b of the spiral elastic element 330 is slidably put between projections 333a and 333b protruding from an inner cylindrical wall of a block 302 of a stationary element 13. Thus, the spiral elastic element 330 is rotatably supported about a shaft of a piston 5. A dynamic pressure generating mechanism 334, comprising a plurality of recesses 334a, is provided on a slide surface between the piston 5 and a cylinder 4. A rotational direction restricting mechanism 337 comprises a ratchet wheel 337a formed along the radially outer portion 330b and a click 337b fixed to the inner cylindrical surface of the block 302 in a cantilever fashion so as to form a ratchet drive arrangement between the ratchet wheel 337a and the click 337b. The rotational direction restricting mechanism 337 limits the rotational direction of the elastic element 330 in the counterclockwise direction.

Operation of the oscillation-type compressor in accordance with the fifteenth embodiment will be explained.

During the compressing operator of the compressor, the radially inner portion 330a of the elastic element 330 shifts in the axial direction of the piston 5 in response to the reciprocative movement of the movable element 12. Meanwhile, the reciprocative movement of the movable element 12 causes a significant rotational displacement between the radially inner portion 330a and the radially outer portion 330b due to the spiral configuration of the elastic element 330. More specifically, a large displacement of the elastic element 330 causes a clockwise rotational displacement, while a small displacement of the elastic element 330 causes a counterclockwise rotational displacement.

When the radially inner portion 330a of the elastic element 330 rotates in the counterclockwise direction with respect to the radially outer portion 330b, the rotational direction restricting mechanism 337 locks the radially outer portion 330b by engagement between the ratchet wheel 337a and the click 337b. As a result, the movable element 12 integral with the radially inner portion 330a of the elastic member 330 rotates in the counterclockwise direction. On the other hand, when the radially inner portion 330a of the elastic element 330 rotates in the clockwise direction with respect to the radially outer portion 330b, the rotational direction restricting mechanism 337 allows the radially outer portion 330b to rotate freely. As a result, the radially outer portion 330b of the elastic element 330 having an inertia moment smaller than that of the piston 5 rotates in the counterclockwise direction.

Accordingly, the piston 5 of the movable element 12 always rotates in the counterclockwise direction.

A plurality of triangular recesses 334a, serving as the hydraulic pressure generating mechanism 334, are formed on a slide surface of the piston 5. When the piston 5 rotates in the counterclockwise direction with respect to the cylinder 4, fluid entering in each recess 334a, such as lubrication oil, is forced to flow toward the narrowed edge portion of the triangular recess 334a in accordance with the rotation of the piston 5, increasing the pressure in proportion to the reduction of the triangular cross section according to the wedge effect. The effect of the generated dynamic pressure is remarkable at the portion where a clearance between the piston 5 and the cylinder 4 is small. Accordingly, the generated dynamic pressure equalizes the axis of the piston 5 with the axis of the cylinder 4 and provides a uniform clearance between the piston 5 and the cylinder 4.

Accordingly, it becomes possible to reduce the coolant gas leaking through a slide surface between the piston 5 and the cylinder 4. The cooling power is increased. Furthermore, elimination of the offset or inclination of the axes of the piston 5 and the cylinder 4 effectively suppresses the friction at the slide portion between the piston 5 and the cylinder 4. Thus, the slide loss can be reduced and the compressor efficiency can be improved.

As described above, the fifteenth embodiment of the present invention provides the oscillation-type compressor comprising the block 302 and the piston 5, the motor 3 including the stator 3a and the mover 3b, the movable element 12 including the mover 3b and the piston 5, the stationary element 13 including the block 302 and the stator 3a, the elastic element 330 having a portion fixed to the movable element 12 and another portion fixed to the stationary element 13, the rotational direction restricting mechanism 337 for limiting the rotation of the elastic element 330 about the shaft of the piston 5 in a single direction, the cylinder 4 accommodating the piston 5 so as to allow the piston 5 reciprocating in the axial direction, and the dynamic pressure generating mechanism 334 provided on at least one of the piston 5 and the cylinder 4. With this arrangement, the elastic element causes a rotational displacement in response to a deformation of the elastic element caused by the reciprocative movement of the movable element. As the elastic element can rotate in a single direction with respect to the stationary element, the piston always rotates in the same direction. The dynamic pressure generating mechanism is provided on a sliding surface of the piston and the cylinder. The rotation of the piston causes the dynamic pressure generating mechanism to generate a dynamic pressure acting between the piston and the cylinder. The generated dynamic pressure equalizes the axis of the piston with the axis of the cylinder and provides a uniform clearance between the piston and the cylinder. Thus, it becomes possible to prevent the coolant gas leakage from the compression chamber. Furthermore, elimination of the offset or inclination of the axes of the cylinder and the piston effectively suppresses the friction at the slide portion between the piston and the cylinder. Thus, the slide loss can be reduced and the compressor efficiency can be improved.

The above-described fifteenth embodiment discloses the spiral elastic element. However, similar effects will be obtained even when this elastic element is replaced by any other elastic element which is capable of causing a rotational displacement in response to an axial displacement.

Sixteenth Embodiment

Figure 20:
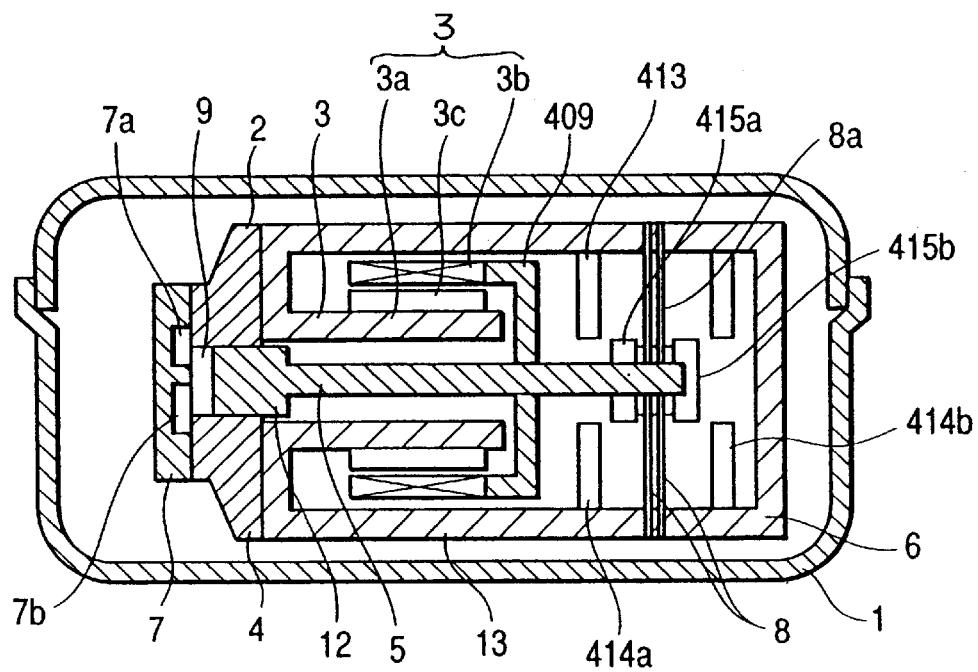
FIG. 20 is a vertical cross-sectional view showing an oscillation-type compressor in accordance with a sixteenth embodiment of the present invention.
Figure 21:
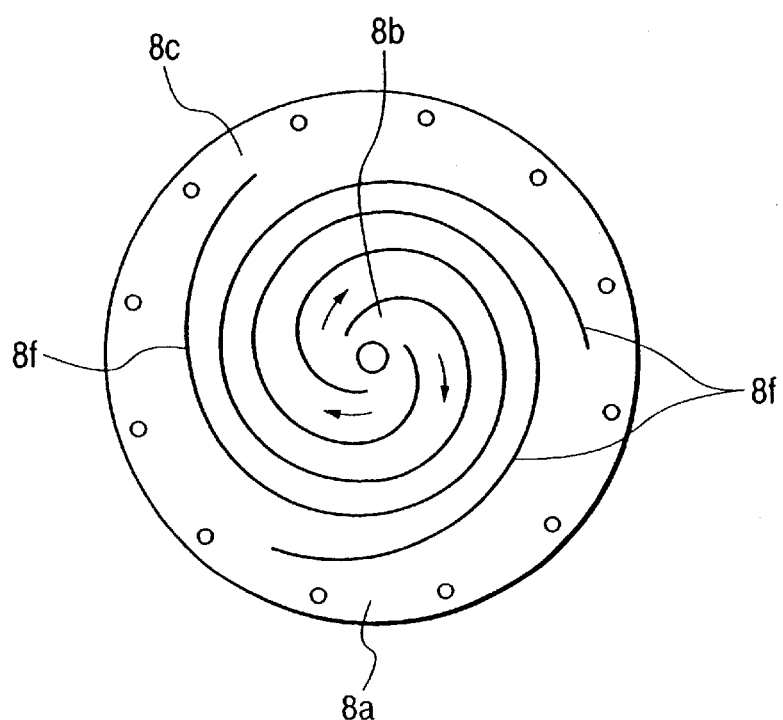
FIG. 21 is a view showing an elastic member used in the oscillation-type compressor in accordance with the sixteenth embodiment of the present invention.

FIG. 20 is a vertical cross-sectional view showing an oscillation-type compressor in accordance with a sixteenth embodiment of the present invention. FIG. 21 is a view showing an elastic member used in the oscillation-type compressor in accordance with the sixteenth embodiment of the present invention. In FIGS. 20 and 21, the oscillation-type compressor comprises a tightly closed casing 1 and a main body 2. The main body 2 comprises a motor 3, a cylinder 4, a piston 5, a block 6, a cylinder dead 7, and an elastic element 8. The main body 2 is elastically supported by a suspension spring (not shown) in the tightly closed casing 1.

The motor 3 comprises a stator 3a and a mover 3b. A permanent magnet 3c is fixed to the stator 3a. The mover 3b (coil) is fixedly connected to the piston 5 via a mover connecting member 409.

The piston 5, the mover 3b of the motor 3, and the mover connecting member 409 cooperatively constitute a movable element 12. The cylinder 4, the stator 3a of the motor 3, and the block 6 cooperatively constitute a stationary element 13.

The elastic element 8 comprises a plurality of stacked or multilayered elastic members 8a. An inner cylindrical portion 8b of the elastic element 8 is fixed to the piston 5. An outer cylindrical portion 8c of the elastic element 8 is fixed to the block 6. Each elastic member 8a comprises a plurality of spiral slits 8f so as to function as a spring.

The piston 5, supported by the cylinder 4 and the elastic element 8, is slidable in the axial direction. The cylinder 4 and the piston 5 cooperatively define a compression chamber 9.

Next, compression mechanism of the above-described oscillation-type compressor will be explained. When alternating current is supplied to the mover 3b (coil) of the motor 3, the permanent magnet 3c generates a magnetic field. Interaction of the mover 3b with this magnetic field generates a force for reciprocating the mover 3b in the axial direction. The piston 5, connected to the mover 3b via the mover connecting member 409, deforms the elastic element 8. Utilizing a reaction force given from the elastic element 8, the piston 5 continuously repeats the axial reciprocative movement.

Furthermore, when the inner cylindrical portion 8b of the elastic member 8a shifts in the up-and-down direction normal to the plane of FIG. 21, the inner cylindrical portion 8b of the elastic member 8a rotates in a direction shown by an arrow shown in FIG. 21. Accordingly, the piston 5 fixed to the inner cylindrical portion 8b of the elastic member 8a rotates in response to the displacement of the elastic element 8a. The piston 5 rotates in changed directions and continues reciprocating.

Coolant gas of a cooling system (not shown) is introduced into a low-pressure chamber 7a of a cylinder head 7 and then enters the compression chamber 9 of the cylinder 4 via an intake valve (not shown) disposed in the cylinder head 7. The coolant gas introduced in the compression chamber 9 is compressed by the piston 5 which reciprocates in the above-described manner. The compressed coolant gas enters a high-pressure chamber 7b of the cylinder head 7 via an exhaust valve (not shown), and then exits the cylinder head 7 to the cooling system.

In FIG. 20, a support mechanism 413 comprises stationary support members 414a and 414b fixed to the stationary element 13 and movable support members 415a and 415b fixed to the movable element 12. The stationary support member 414a is disposed closely to the compression chamber 9 than the other stationary support member 414b. The movable support member 415a is disposed closely to the compression chamber 9 than the other movable support member 415b. The movable support members 415a and 415b are put between the stationary support members 414a and 414b and axially offset inward than the corresponding stationary support members 414a and 414b.

Operation of the oscillation-type compressor of the sixteenth embodiment will be explained.

During the compressing operation of the compressor, the piston 5 reciprocates in the cylinder 4. When the piston 5 shifts closely to the compression chamber 9 than its stop position, the elastic element 8 deforms in response to a shift movement of the piston 5. The elastic element 8 has a radial rigidity decreasing in accordance with its deformation amount.

Similarly, when the piston 5 shifts far from the compression chamber 9 than its stop position, the elastic element 8 deforms in response to a shift movement of the piston 5. The rigidity of the elastic element 8 decreases in accordance with its deformation amount.

In the motor 3, air gap provided for separating the mover 3b from the stator 3a is not completely uniform. Therefore, the mover 3b is always attracted toward the stator 3a in a certain radial direction.

When the piston 5 is positioned closely to its stop position, the elastic element 8 causes a smaller deformation. The radial rigidity of the elastic element 8 is sufficiently high. In this case, even when the mover 3b of the motor 3 is radially attracted in the radial direction due to the uneven air gap, support of the movable element 12 in the radial direction can be done with the slide portion between the piston 5 and the cylinder 4 and the elastic element 8. No local side pressure will act on the slide portion between the piston 5 and the cylinder 4.

When the piston 5 is positioned near the top dead center or the bottom dead center, the elastic element 8 deforms largely with decreased radial rigidity. Thus, the elastic element 8 cannot sufficiently support the movable element 12 in the radial direction.

However, when the piston 5 is positioned near the top dead center, the stationary support member 414a fixed to the stationary element 13 engages with the movable support member 415a fixed to the movable element 12 so that the stationary support member 414a substantially supports the movable support member 415a in the radial direction. When the piston 5 is positioned near the bottom dead center, the stationary support member 414b fixed to the stationary element 13 engages with the movable support member 415b fixed to the movable element 12 so that the stationary support member 414b substantially supports the movable support member 415b in the radial direction.

Accordingly, it becomes possible to support the movable element 12 in the radial direction at the support mechanism 413 in addition to the slide portion between the piston 5 and the cylinder 4 and the elastic element 8, even when the piston 5 is positioned near the top dead center or the bottom dead center and therefore the elastic element 8 cannot sufficiently support the movable element 12 in the radial direction due to reduced rigidity. Thus, this embodiment eliminates the local side pressure acting on the slide portion between the piston 5 and the cylinder 4, while preventing the deterioration of reliability, such as reduction in the compressor efficiency and the wear occurring at the slide portion between the piston 5 and the cylinder 4.

As described above, the sixteenth embodiment of the present invention provides the oscillation-type compressor comprising the tightly closed casing 1, the piston 5 and the cylinder 4 accommodated in the tightly closed casing 1, the motor 3 including the stator 3a and the mover 3b, the stationary element 13 including the cylinder 4 and the stator 3a of the motor 3, the movable element 12 including the piston 5 and the mover 3b of the motor 3, the elastic element 8 having a portion fixed or connected to the movable element 12 and another portion fixed or connected to the stationary element 13, and the support mechanism 413 for supporting the movable element 12 in the radial direction when the piston 5 is positioned near the top dead center position or the bottom dead center. This arrangement makes it possible to support the movable element 12 in the radial direction at the support mechanism 413 in addition to the slide portion between the piston 5 and the cylinder 4 and the elastic element 8, even when the piston 5 is positioned near the top dead center or the bottom dead center and therefore the elastic element 8 cannot sufficiently support the movable element 12 in the radial direction due to reduced rigidity.

Thus, the sixteenth embodiment eliminates the local side pressure acting on the slide portion between the piston 5 and the cylinder 4, while preventing the deterioration of reliability, such as reduction in the compressor efficiency and wear occurring at the slide portion between the piston 5 and the cylinder 4.

Although the above-described sixteenth embodiment discloses the elastic element 8 including a plurality of multi-layered elastic members 8a each comprising a plurality of slits 8f, the elastic element 8 can be constituted by any other comparable elastic element capable of reciprocating the piston 5 and having a radial rigidity reducing in accordance with its deformation amount.

Although the above-described sixteenth embodiment discloses the motor 3 comprising the motor 3a and the mover 3b, any other motor arrangement for reciprocating the piston 5 can be used.

Although the above-described sixteenth embodiment discloses the elastic element 8 directly fixed to the piston 5, it is possible to use a connecting member for fixing the elastic element 8 to the piston 5 or it is possible to connect them in the axial direction.

Seventeenth Embodiment

Figure 22:
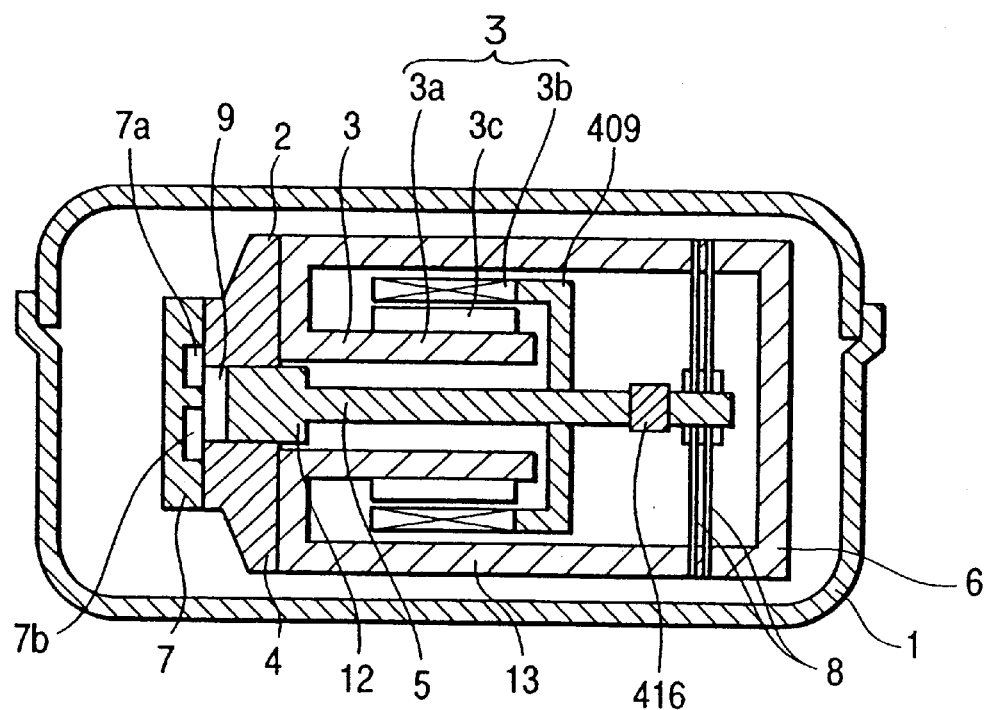
FIG. 22 is a vertical cross-sectional view showing an oscillation-type compressor in accordance with a seventeenth embodiment of the present invention.

FIG. 22 is an oscillation-type compressor in accordance with a seventeenth embodiment of the present invention.

The seventeenth embodiment differs from the sixteenth embodiment in that the movable element 12 is equipped with a position changing mechanism 416. The position changing mechanism 416 can change an axial position of the movable element 12. For example, the position changing mechanism 416 is a shape memory alloy whose axial length is short when the temperature is low and long when the temperature is high.

Operation of the oscillation-type compressor in accordance with the seventeenth embodiment will be explained.

The compression chamber 9 is held at a lower pressure due to insufficiently pressurization immediately after the startup of the compressor or when the ambient air temperature is low. A gas pressure available for shifting the piston 5 away from the compression chamber 9 is small. Accordingly, the oscillation center of the piston 5 is dislocated so closely to the compression chamber 9 that the piston 5 may collide with the cylinder head 7 or the exhaust valve.

However, in such operating conditions, the position changing mechanism 416 has a short axial length due to the low temperature of the compression chamber. Accordingly, the top dead center position of the piston 5 is sufficiently far from the cylinder head 7 and the exhaust valve so that the piston 5 can be prevented from colliding with the cylinder head 7 and the exhaust valve. This prevents the cylinder head 7 and the exhaust valve from being damaged. Noise is generated.

Furthermore, when the compressor temperature reaches a higher level in accordance with elapse of time, or when the ambient temperature is high, attained pressurization is sufficiently high. In such operating conditions, a sufficiently large gas pressure is available for shifting the piston 5 in the direction opposed to the compression chamber 9. Accordingly, the oscillation center of the piston 5 is dislocated away from the compression chamber 9 so as to separate the piston 5 sufficiently far away from the cylinder head 7 and the exhaust valve, causing no collision between them.

On the contrary, the piston 5 may not reach the ordinary top dead center. The top clearance of the piston will increase excessively, causing significant reduction in the cooling power and in the compressor efficiency. However, in such operating conditions, the position changing mechanism 416 has a long axial length due to increased compressor temperature. Thus, the position changing mechanism 416 dislocates the top dead center of the piston 5 toward the cylinder head 7 and the exhaust valve. Thus, it becomes possible to prevent the top clearance of the piston 5 from increasing excessively and realize an ordinary operation satisfactory in the cooling power as well as the compression efficiency.

As described above, the seventeenth embodiment of the present invention provides the oscillation-type compressor comprising the tightly closed casing 1, the piston 5 and the cylinder 4 accommodated in the tightly closed casing 1, the motor 3 including the stator 3a and the mover 3b, the stationary element 13 including the cylinder 4 and the stator 3a of the motor 3, the movable element 12 including the piston 5 and the mover 3b of the motor 3, the elastic element 8 having a portion fixed to the movable element 12 and another portion fixed to the stationary element 13, and the position changing mechanism 416 associated with the movable element 12 for changing an axial position of the movable element 12. With this arrangement, it becomes possible to prevent the piston 5 from colliding with the cylinder head 7 or the exhaust valve when the movable element 12 including the piston 5 is dislocated toward the compression chamber 9 due to the insufficient pressurization occurring immediately after the startup of the compressor or when the ambient air temperature is low. Thus, the seventeenth embodiment of the present invention prevents the compressor from being damaged, while adequately maintaining the reliability. Noise is suppressed.

Furthermore, when the compressor temperature reaches a higher level in accordance with elapse of time, or when the ambient temperature is high, the attained pressurization is sufficiently high. In such operating conditions, the movable element 12 including the piston 5 is dislocated away from the compression chamber 9. However, the seventeenth embodiment of the present invention prevents the top clearance of the piston 5 from increasing excessively and realizes an ordinary operation satisfactory in the cooling power as well as the compression efficiency.

The position changing mechanism 416 disclosed in the above-described seventeenth embodiment is the functional element whose axial length is variable in response to the temperature change. However, the position changing mechanism 416 can be constituted by any other comparable element capable of changing the axial position of the movable element 12 in response to changed external temperature and pressure conditions.

Although the above-described seventeenth embodiment discloses the motor 3 comprising the motor 3a and the mover 3b, any other motor arrangement for reciprocating the piston 5 can be used.

Eighteenth Embodiment

Figure 23:
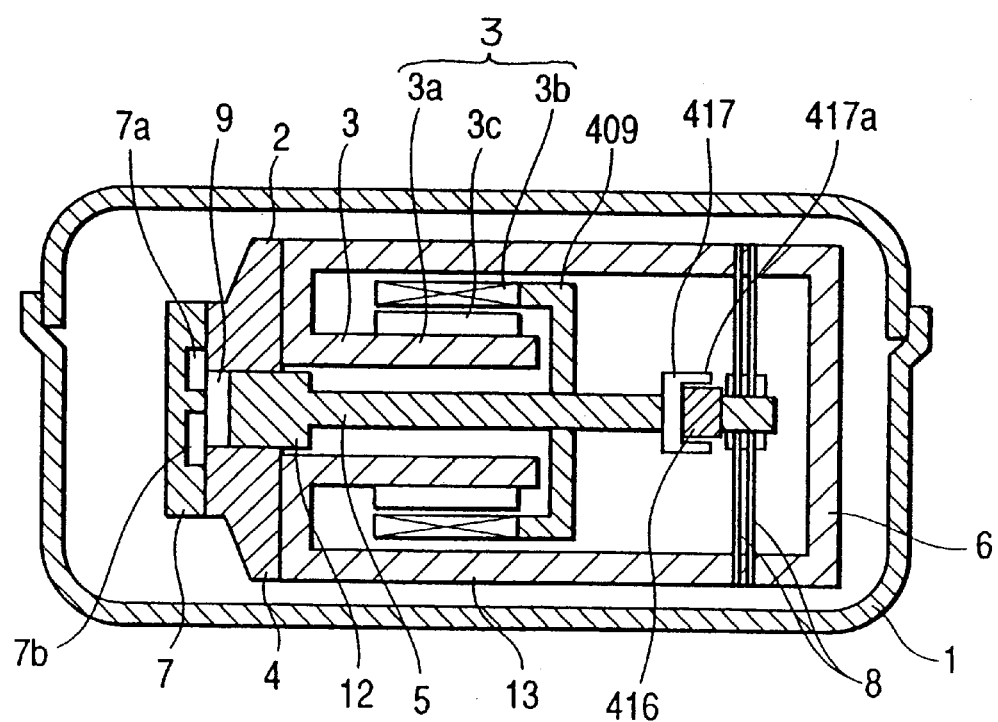
FIG. 23 is a vertical cross-sectional view showing an oscillation-type compressor in accordance with an eighteenth embodiment of the present invention.

FIG. 23 is an oscillation-type compressor in accordance with an eighteenth embodiment of the present invention.

The eighteenth embodiment differs from the seventeenth embodiment in that a stopper 417 is provided to limit an axial shift amount of the movable element 12 changed by the position changing mechanism 416.

Operation of the oscillation-type compressor in accordance with the eighteenth embodiment will be explained.

The compression chamber 9 is held at a lower pressure due to insufficiently pressurization immediately after the startup of the compressor or when the ambient air temperature is low. A gas pressure available for shifting the piston 5 away from the compression chamber 9 is small. Accordingly, the oscillation center of the piston 5 is dislocated toward the compression chamber 9. The piston 5 may collide with the cylinder head 7 or the exhaust valve.

However, in such operating conditions, the position changing mechanism 416 has a short axial length due to the low temperature of the compression chamber. Accordingly, the top dead center position of the piston 5 is sufficiently far from the cylinder head 7 and the exhaust valve so that the piston 5 can be prevented from colliding with the cylinder head 7 and the exhaust valve. This prevents the cylinder head 7 and the exhaust valve from being damaged. Noise is generated.

The axial length of the position changing mechanism 416 may be extremely decreased in response to extremely changed operating conditions including the sudden changes in the ambient air temperature or in the pressurization. However, when the axial length of the position changing mechanism 416 becomes shorter than a predetermined value, an end surface 417a of the stopper 417 is brought into contact with the elastic element 8. Thus, the stopper 417 restricts the excessive shift movement of the movable element 12 away from the compression chamber 9.

Accordingly, it becomes possible to prevent the top clearance of the piston from increasing excessively and to realize an ordinary operation satisfactory in the cooling power as well as the compression efficiency.

As described above, the eighteenth embodiment of the present invention provides the oscillation-type compressor further comprising the stopper 417 for limiting the axial shift amount of the movable element 12 changed by the position changing mechanism 416. With this arrangement, it becomes possible to prevent the movable element 12 from excessively shifting away from the compression chamber 9 in response to extremely changed operating conditions including the sudden changes in the ambient air temperature or in the pressurization, thereby eliminating deterioration of the cooling power and lack of the compression.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An oscillation-type compressor comprising:

a block and a piston;

a motor including a stator and a mover;

a movable element including said mover and said piston;

a stationary element including said block and said stator;

an elastic element having a portion fixed to said movable element and another portion fixed to said stationary element;

a rotational direction restricting mechanism for limiting the rotation of said elastic element about a piston shaft in a single direction;

a cylinder accommodating said piston so as to allow said piston reciprocating in an axial direction; and a dynamic pressure generating mechanism provided on at least one of said piston and said cylinder.

* * * * *